Figure 44:
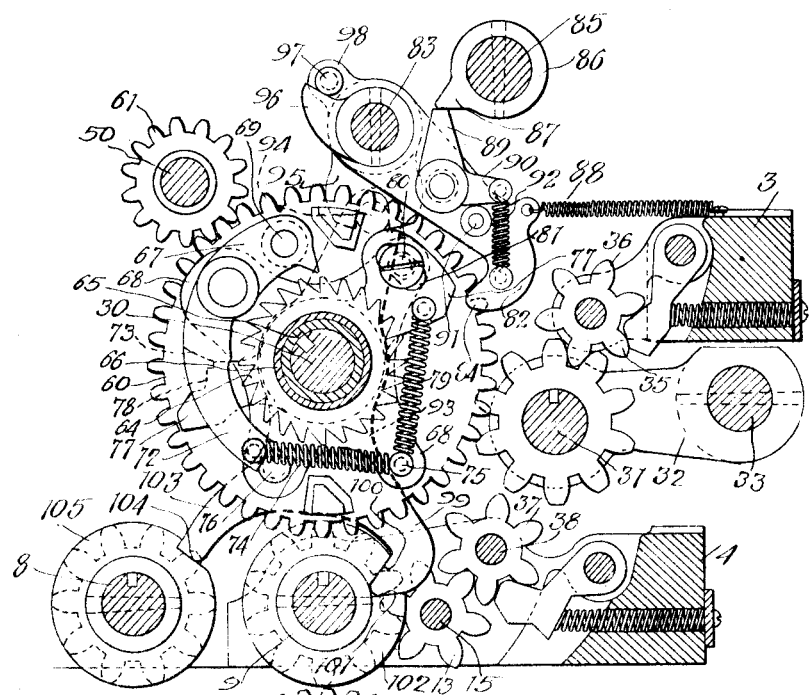

W. I. OHMER, D. B. WHISTLER & J. E. McALLISTER.
REGISTER.
APPLICATION FILED OCT. 31, 1910.
1,056,824.
Patented Mar. 25, 1913.
19 SHEETS—SHEET 1.
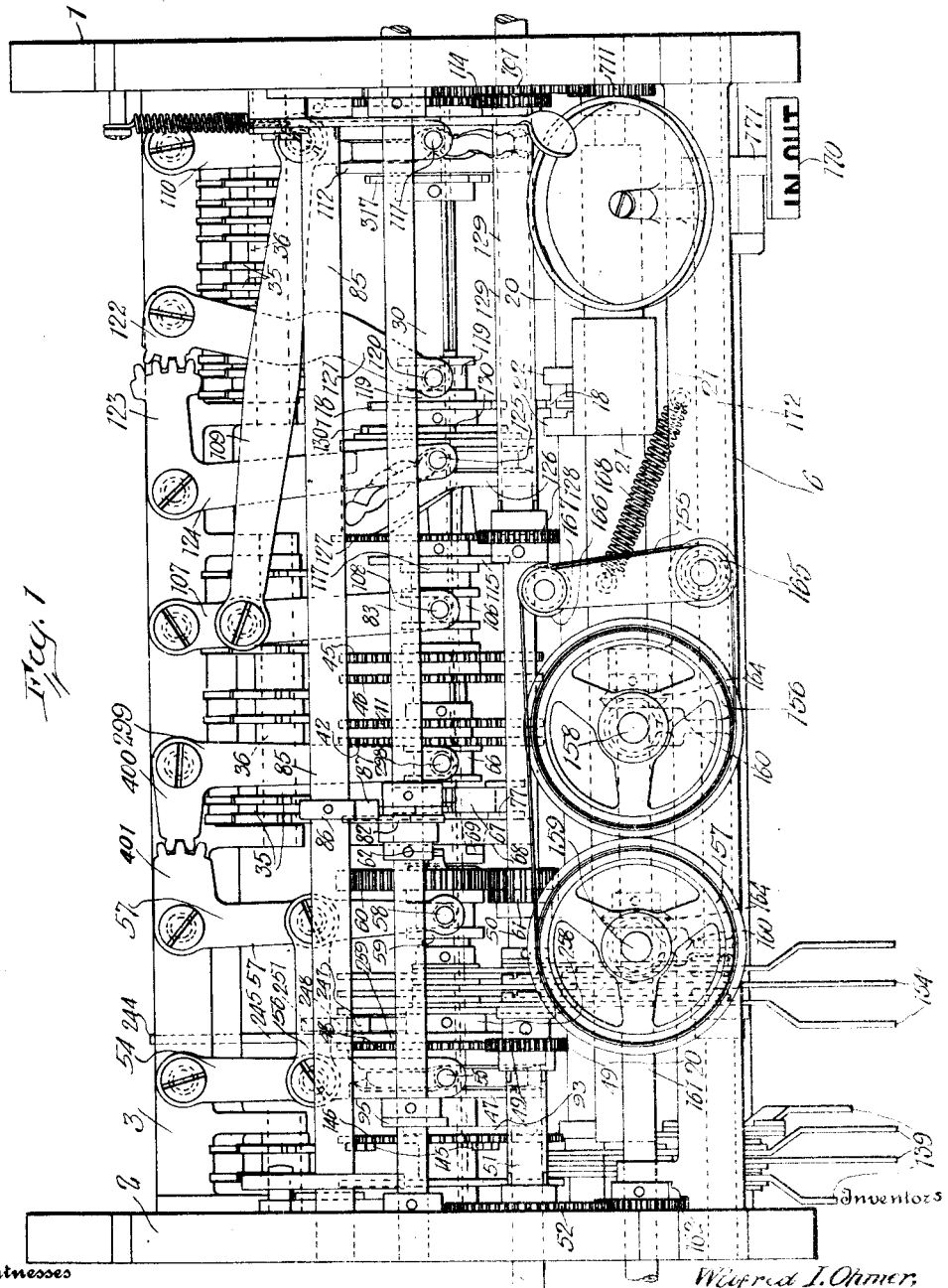

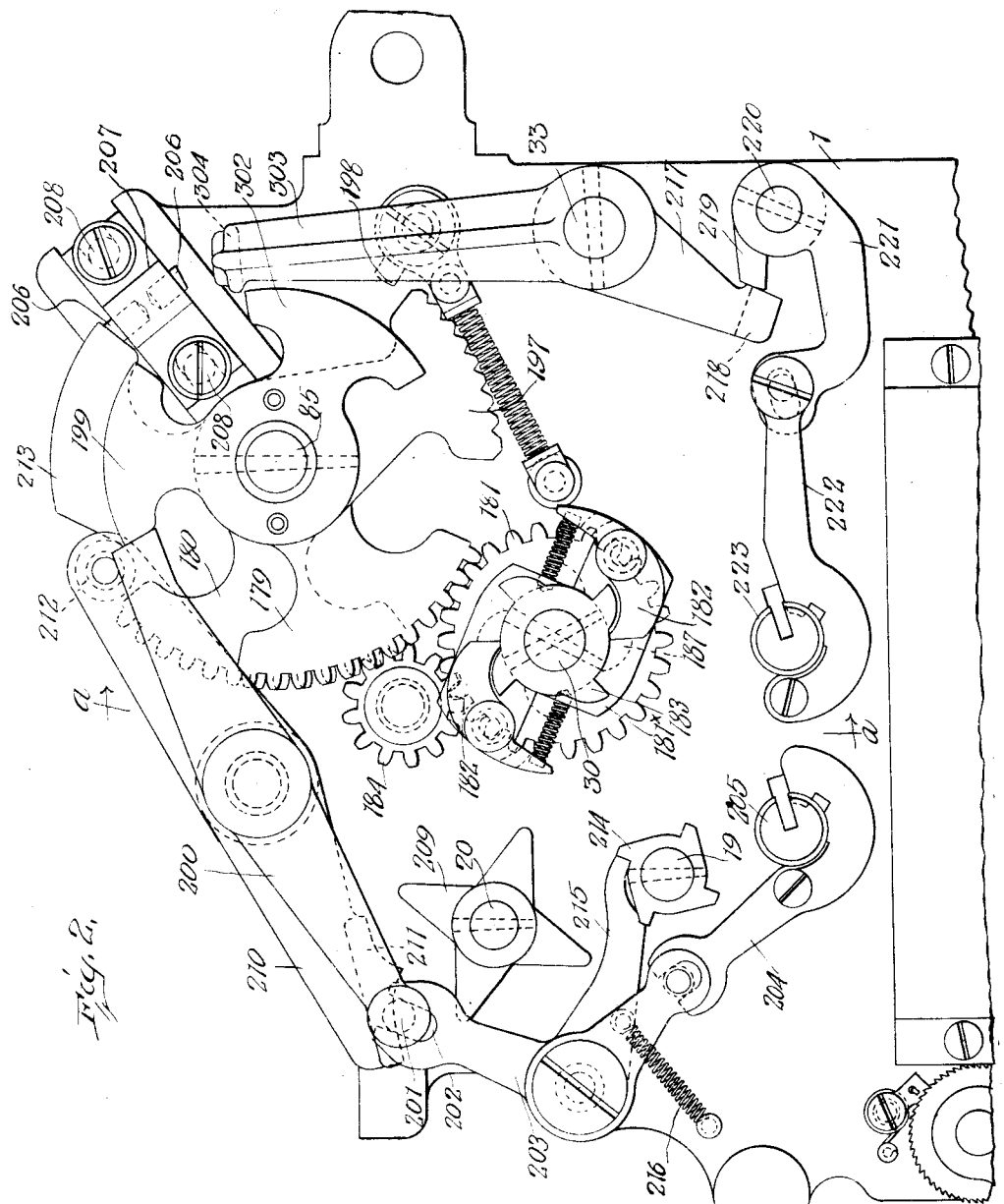

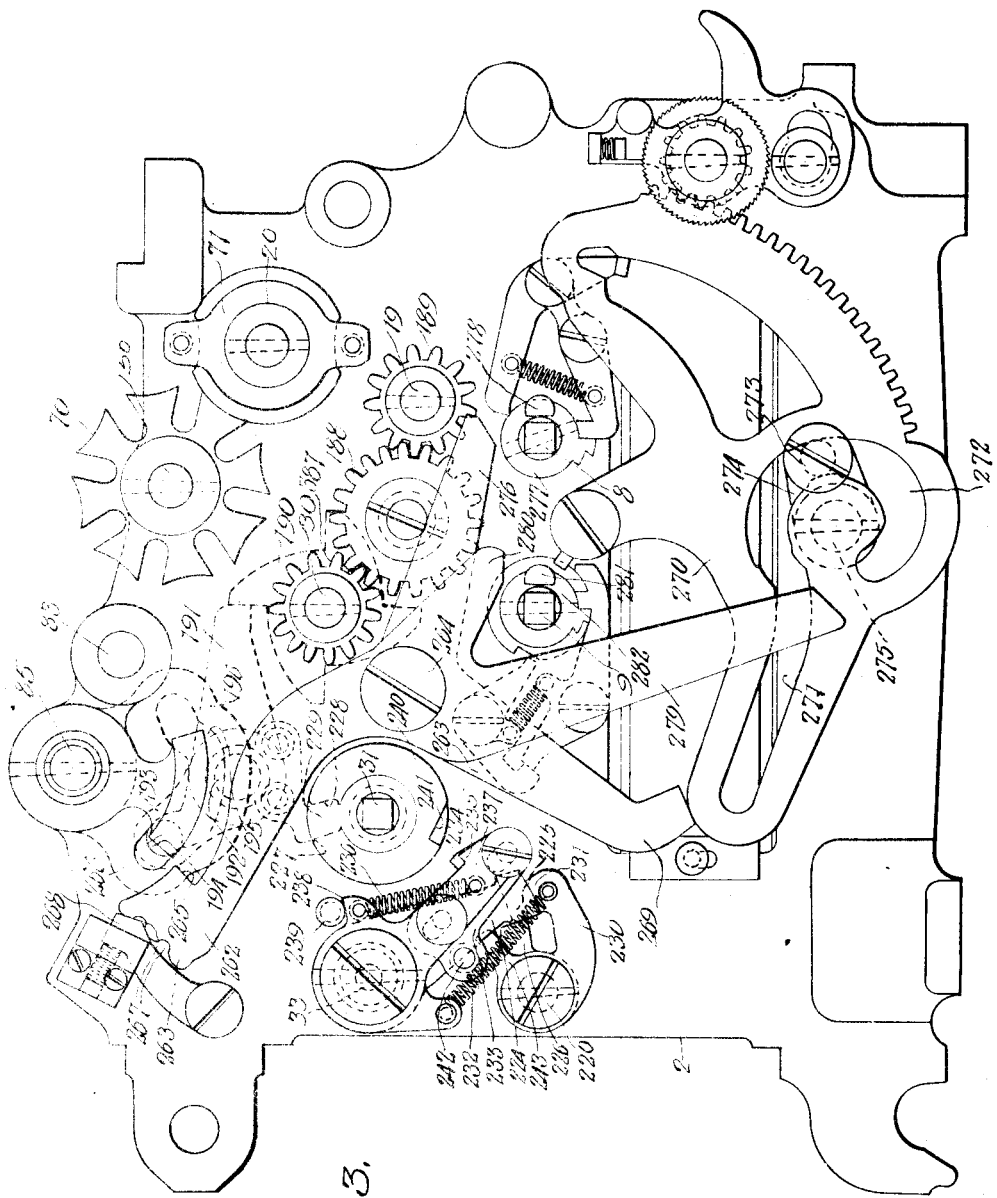

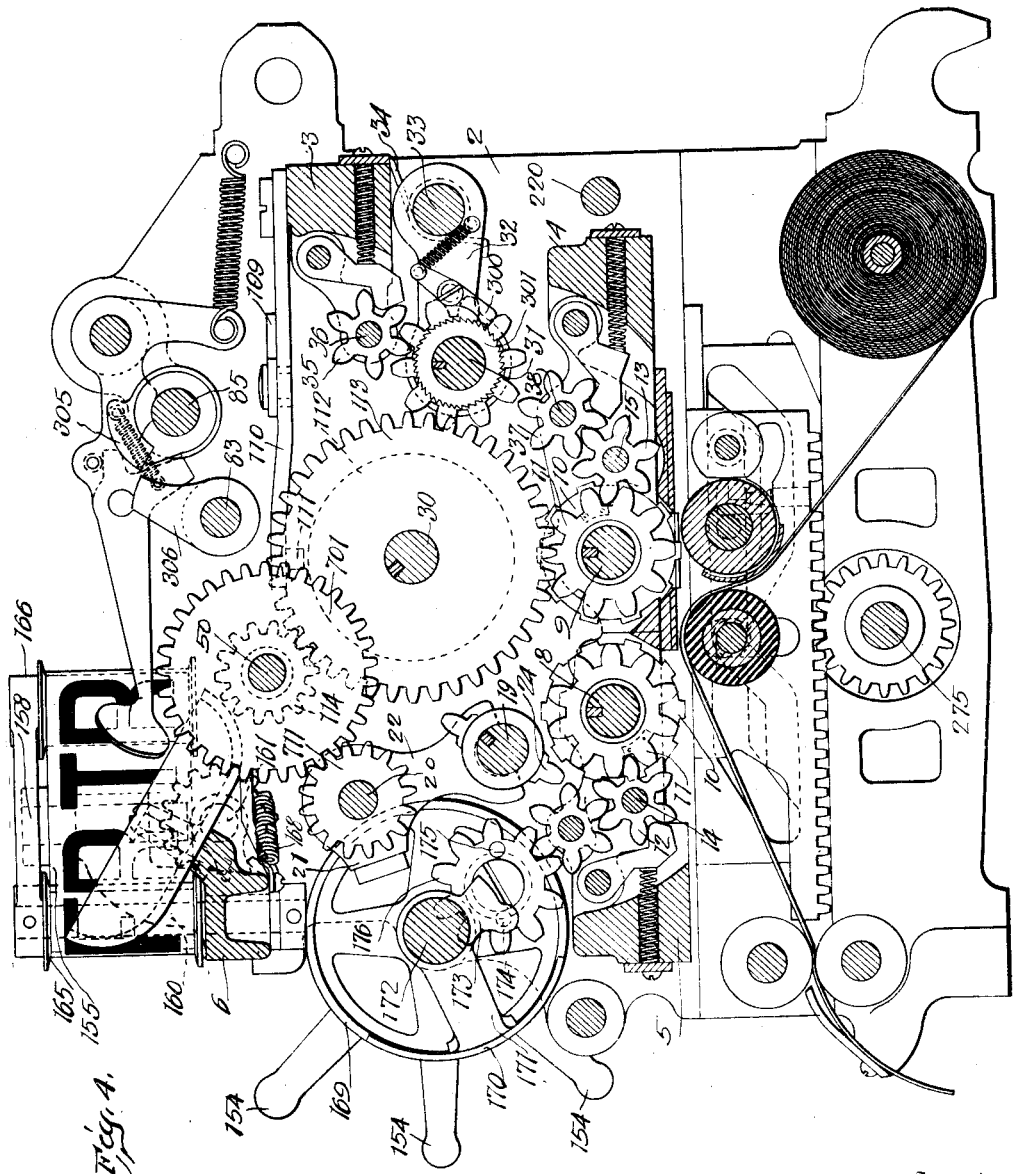

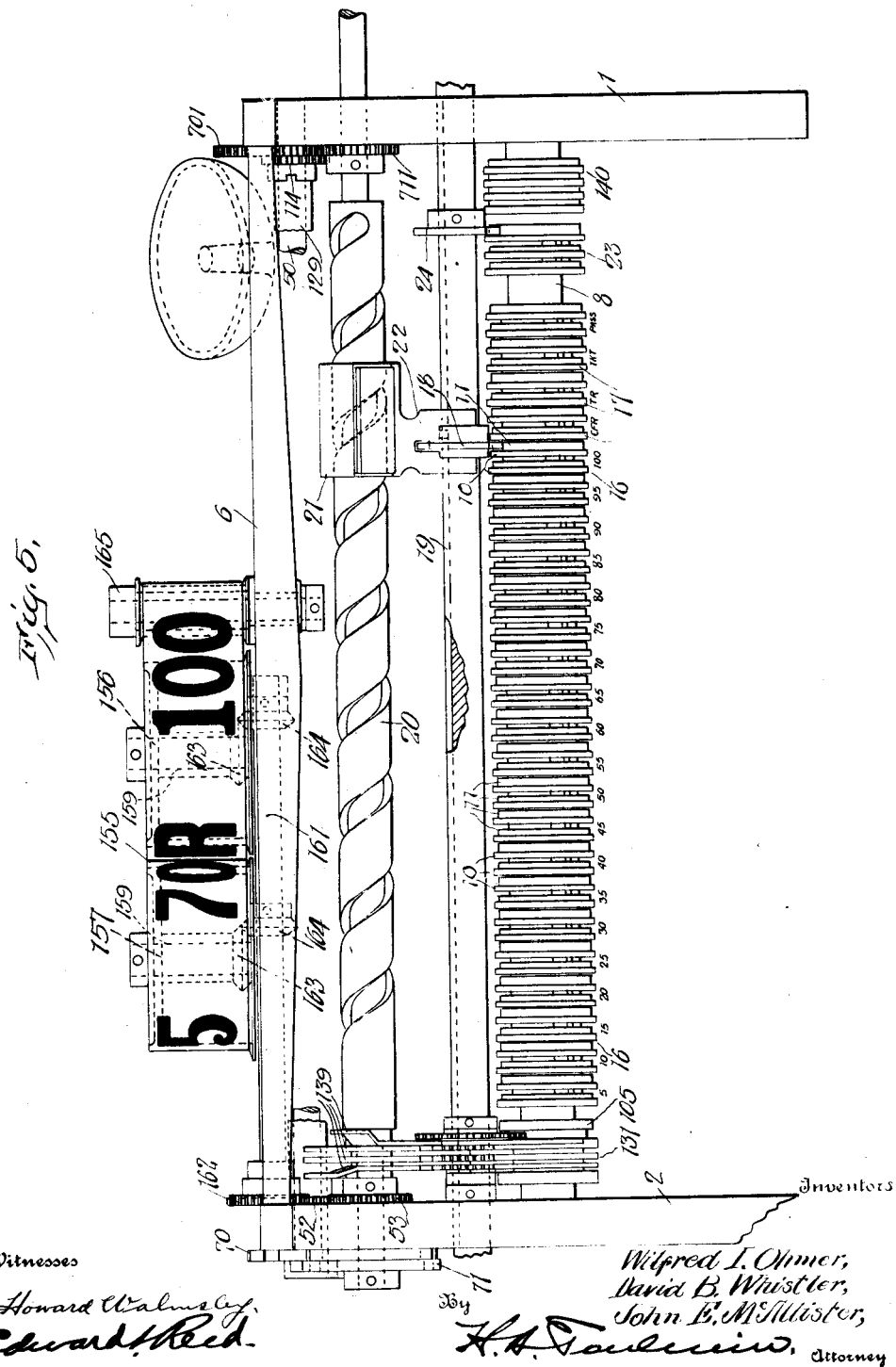

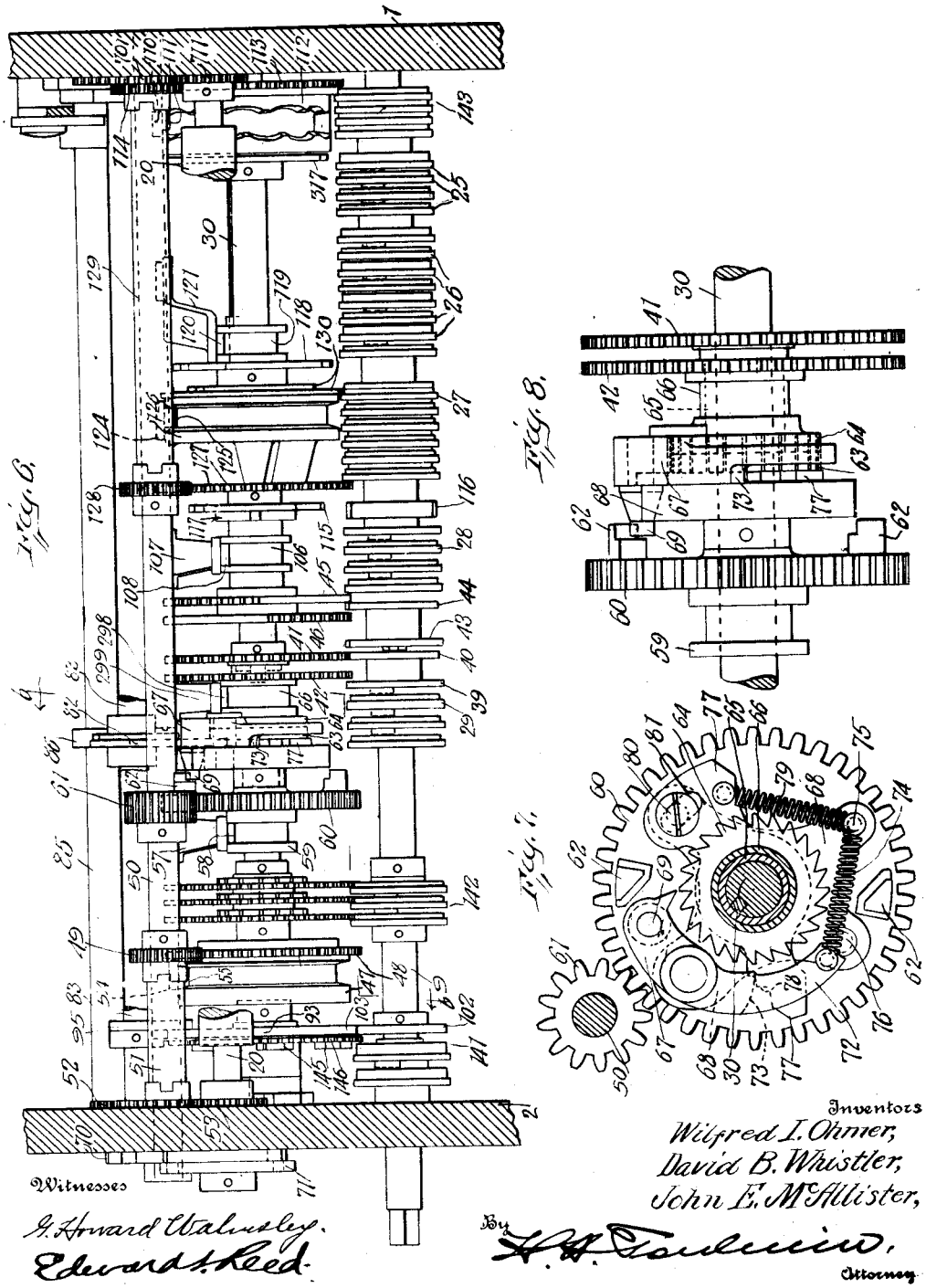

W. I. OHMER, D. B. WHISTLER & J. E. McALLISTER.
REGISTER.
APPLICATION FILED OCT. 31, 1910.
1,056,824.
Patented Mar. 25, 1913.
19 SHEETS—SHEET 7.
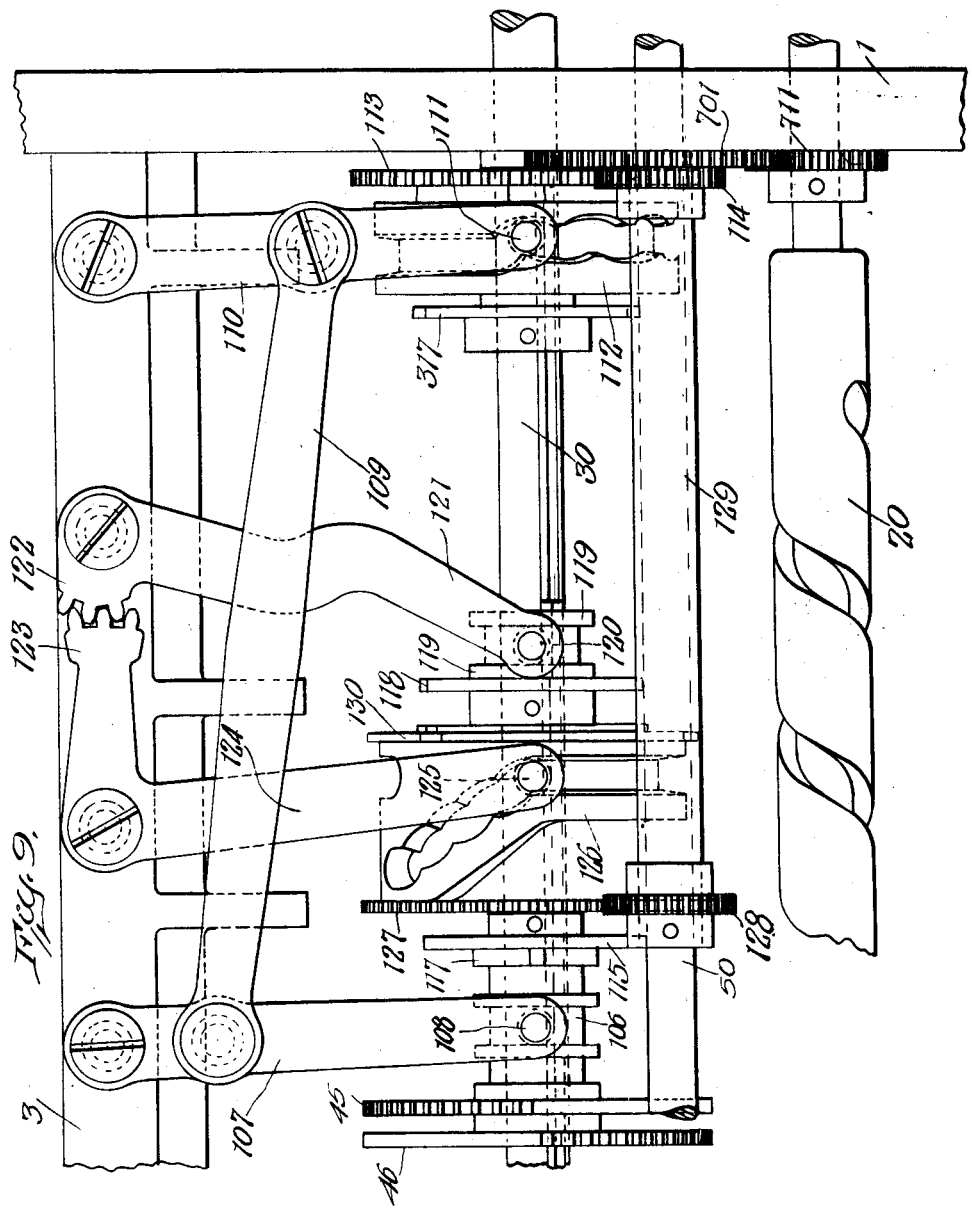

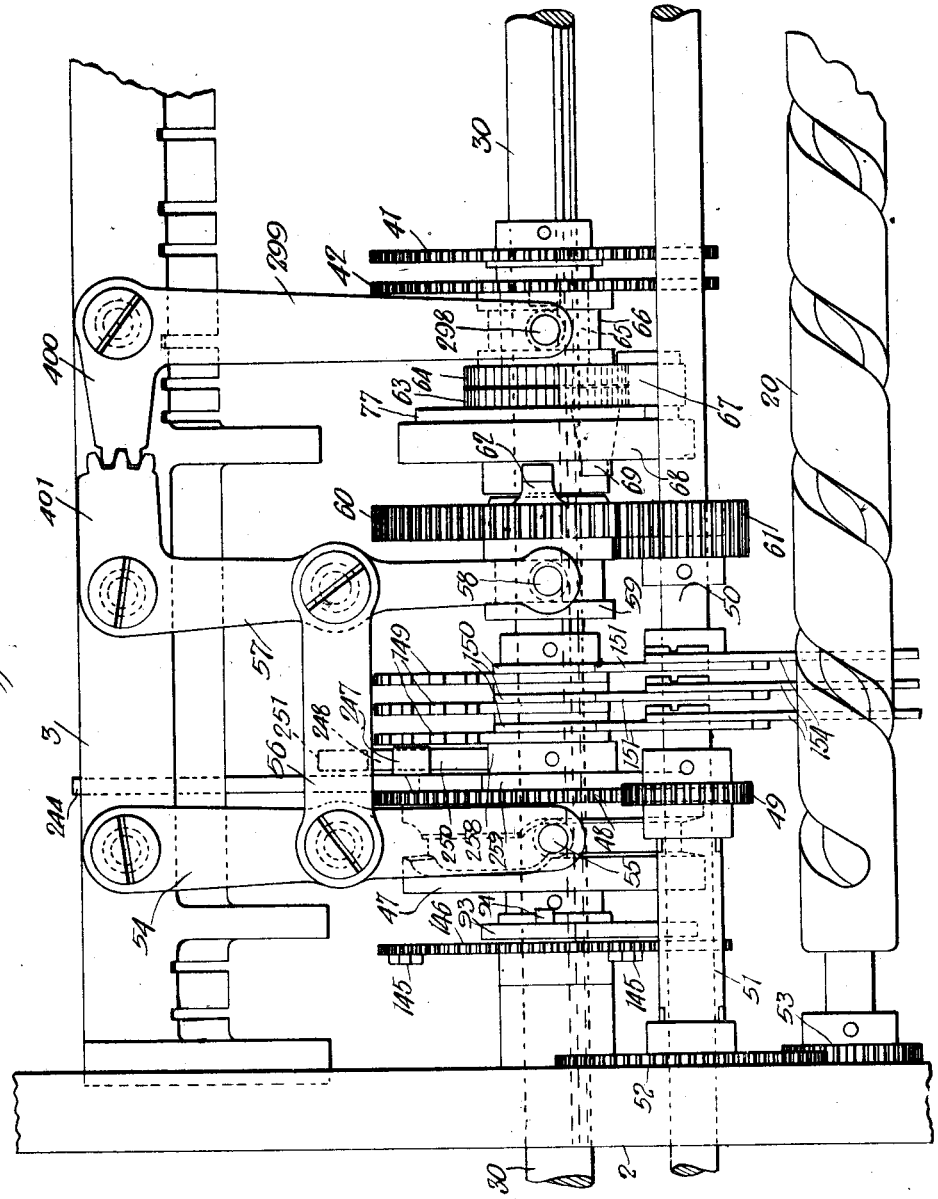

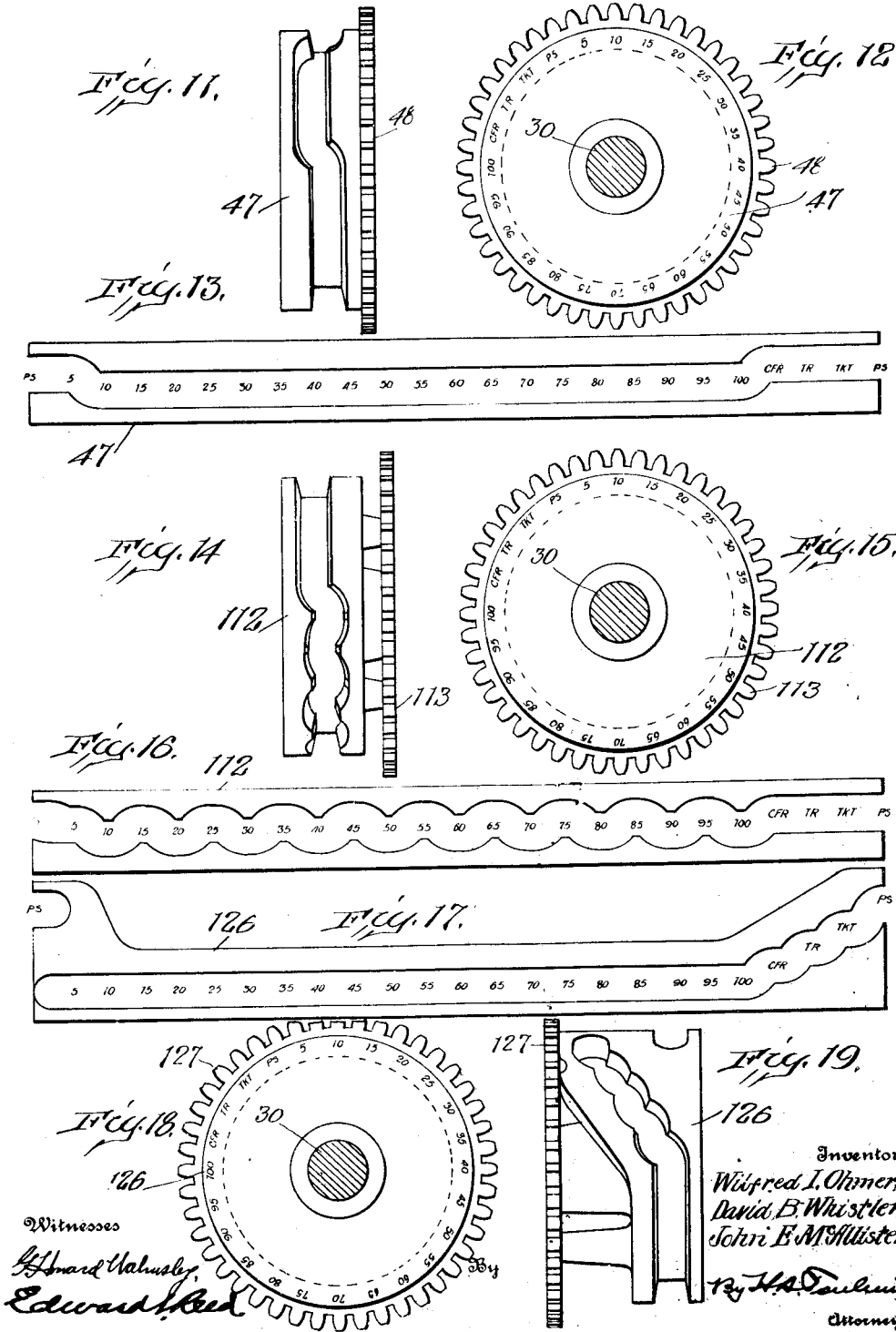

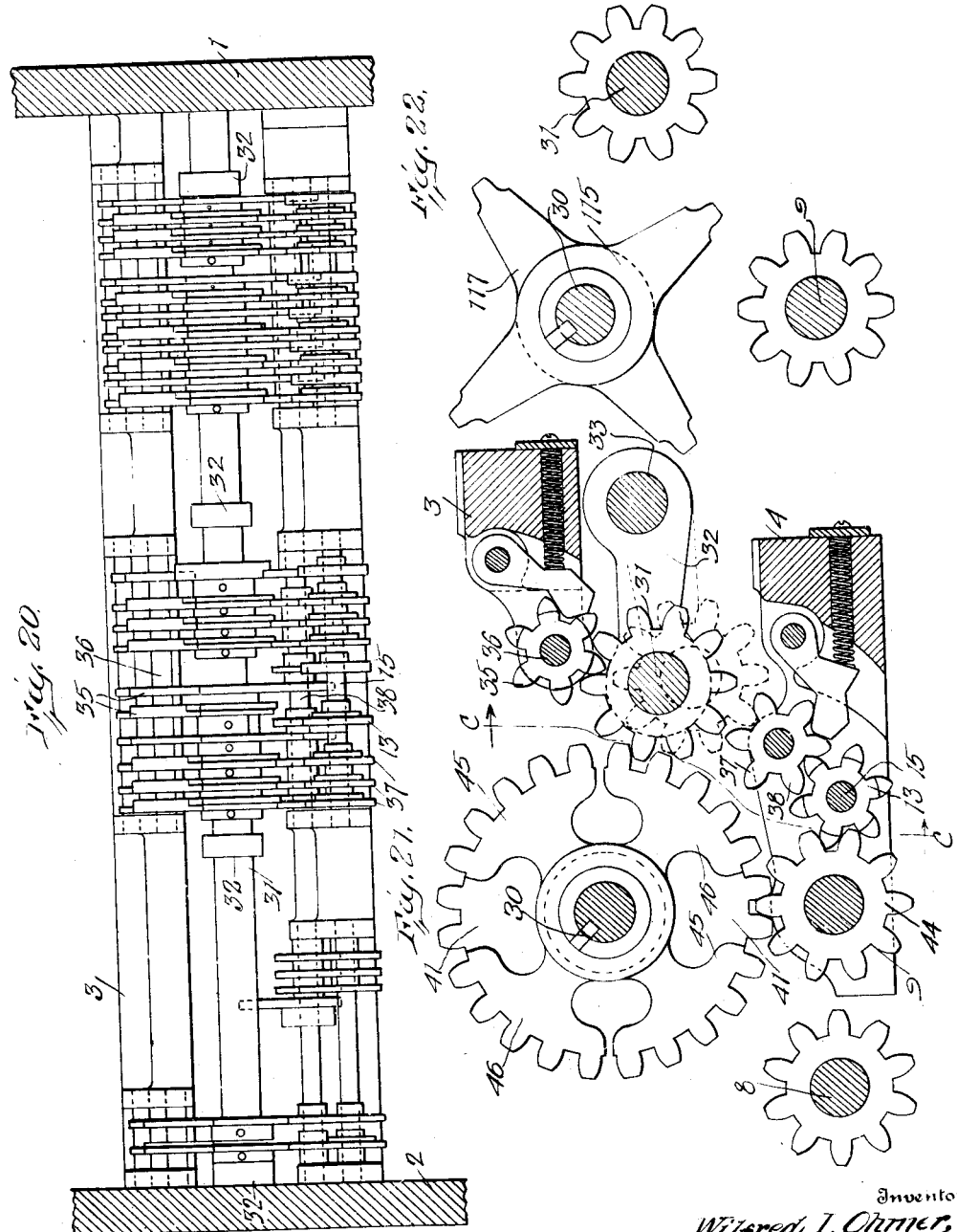

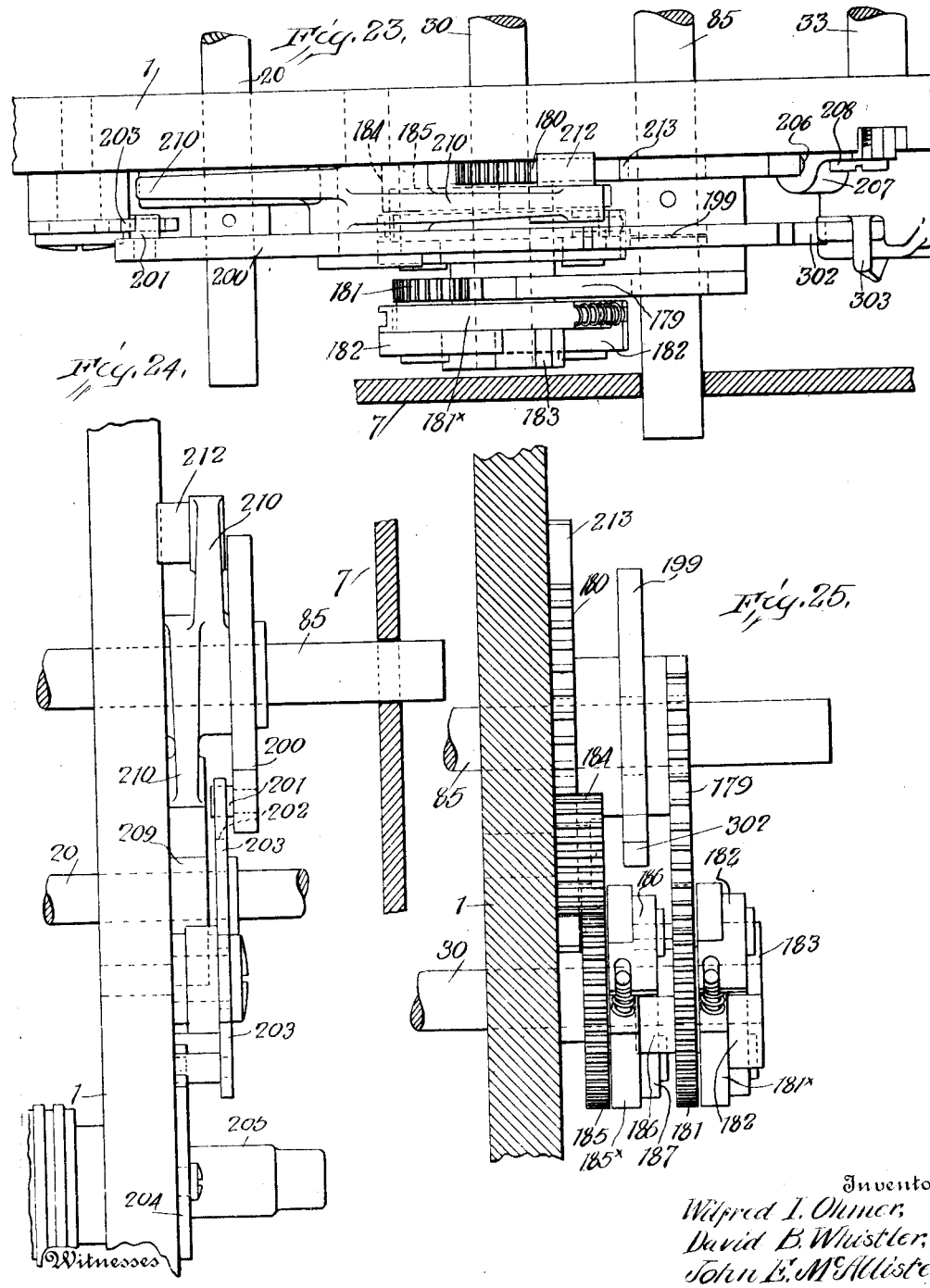

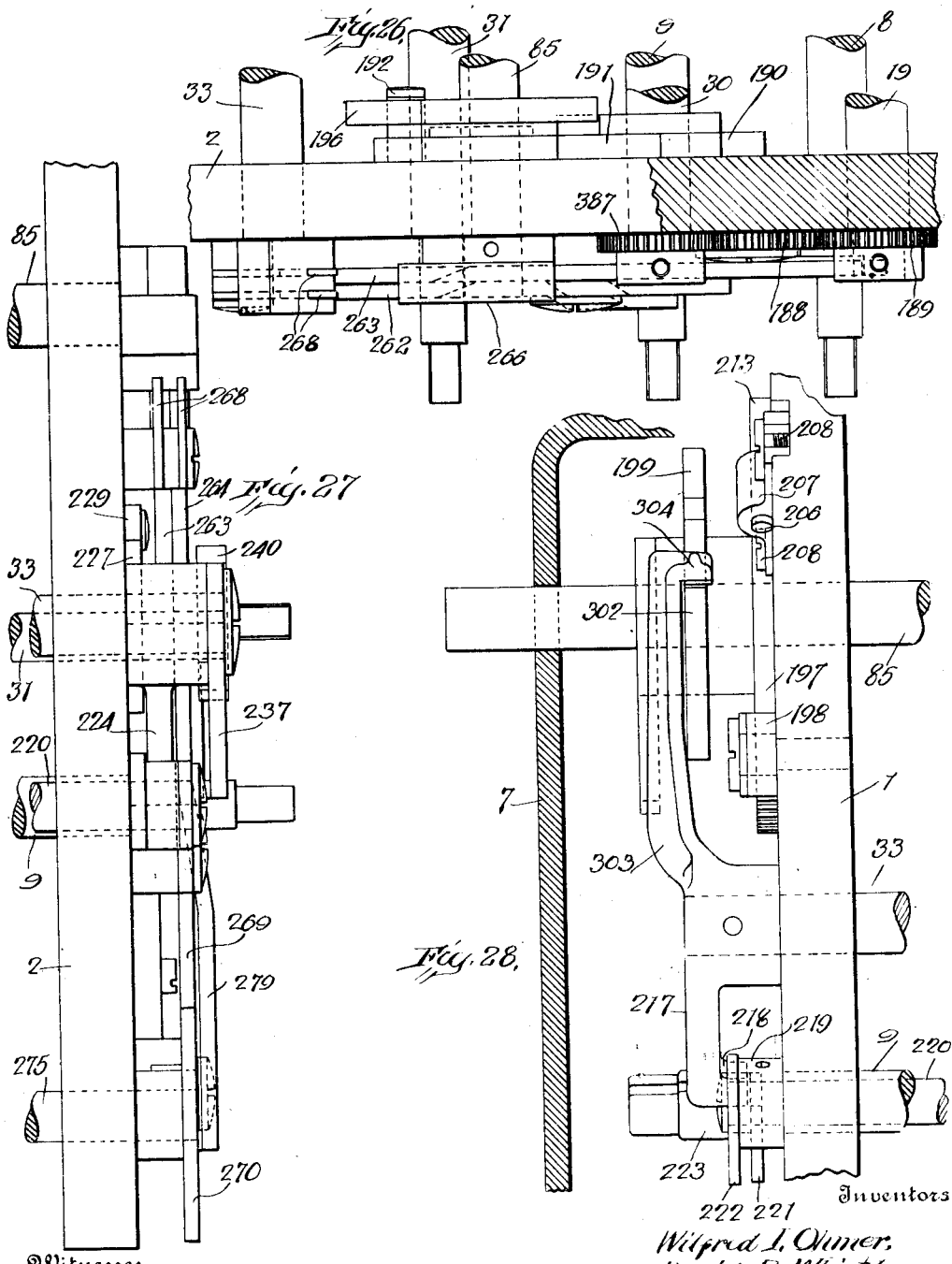

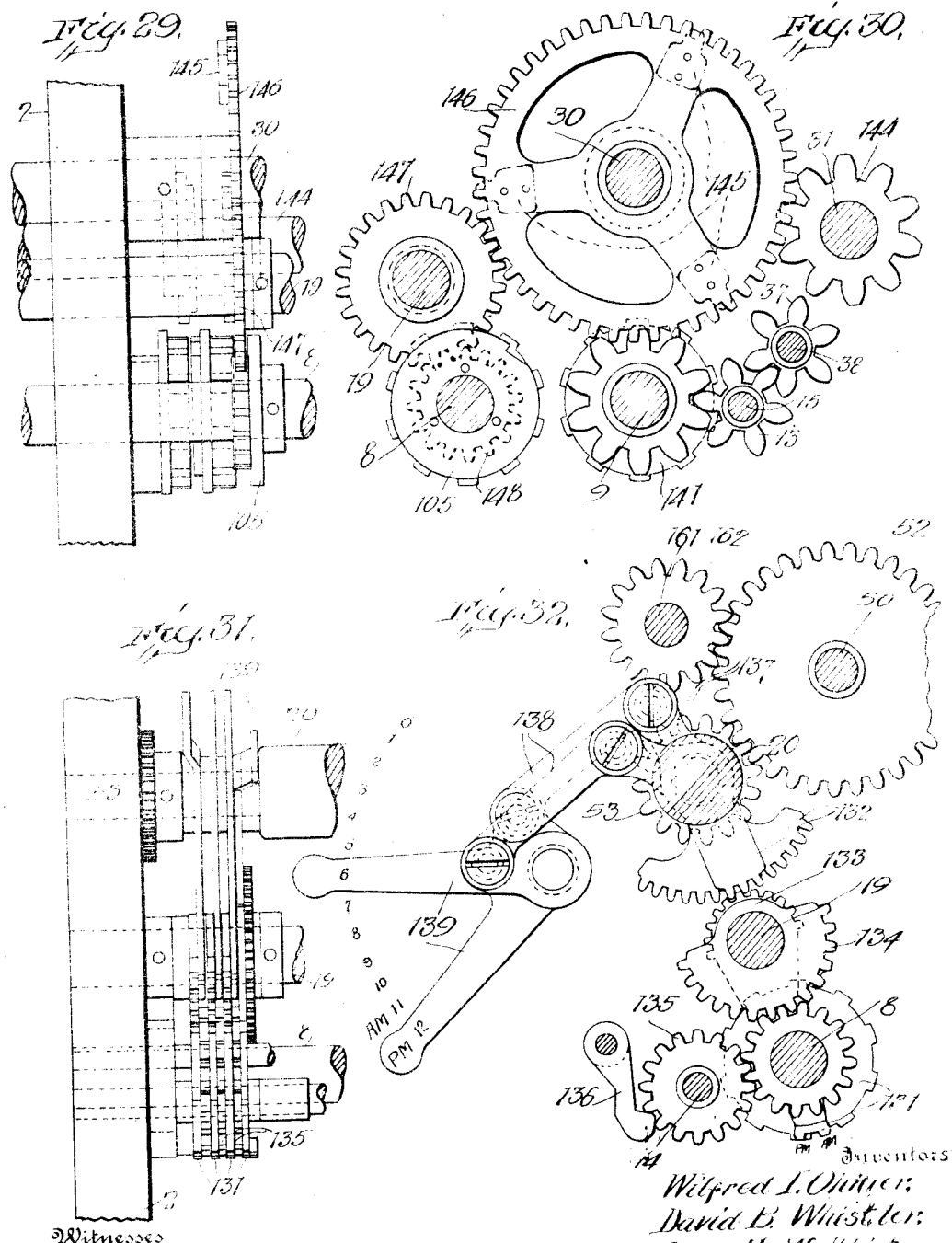

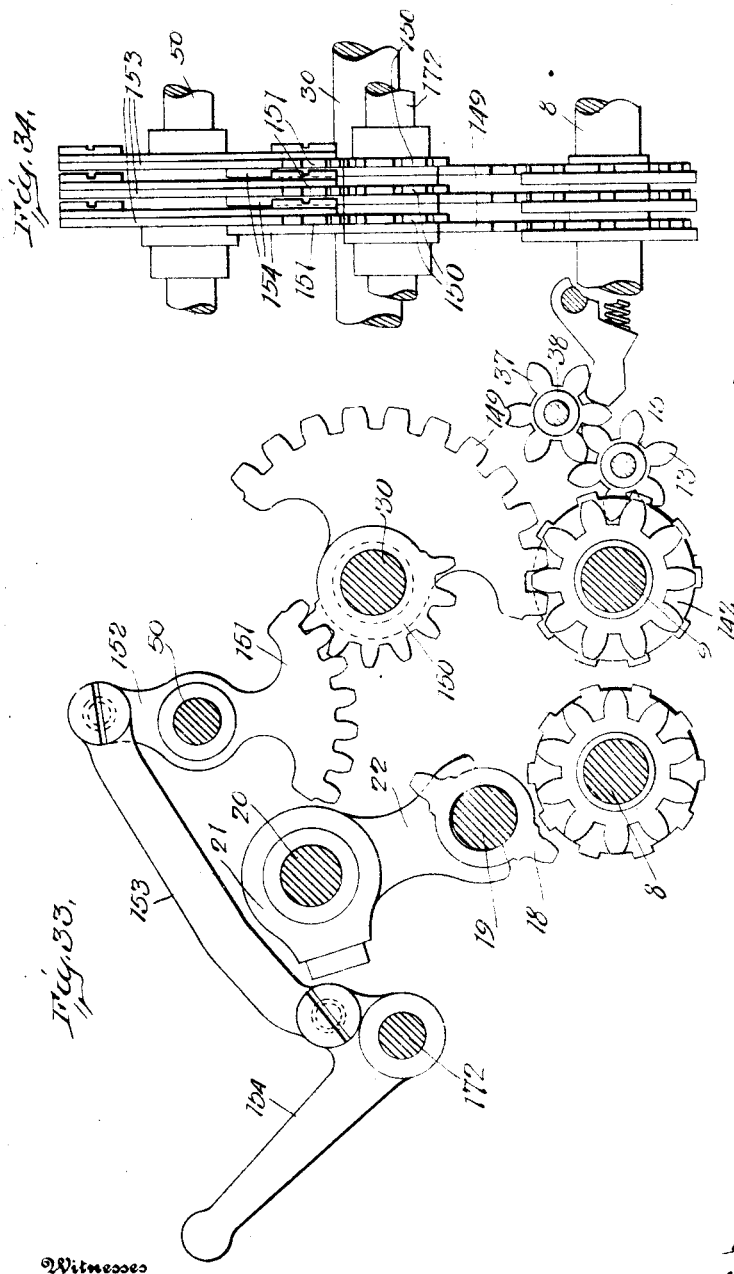

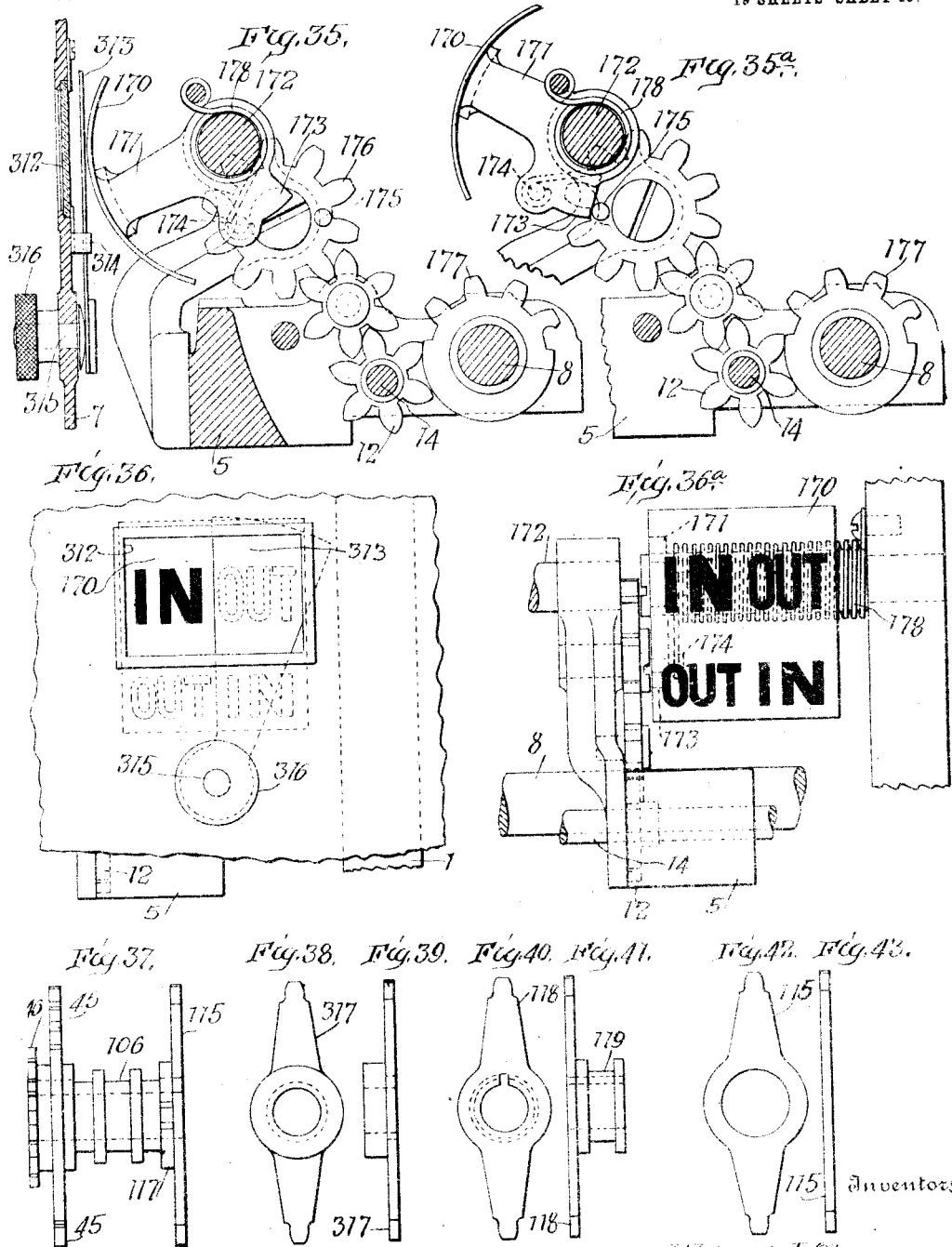

W. I. OHMER, D. B. WHISTLER & J. E. McALLISTER.
REGISTER.
APPLICATION FILED OCT. 31, 1910.

1,056,824.

Patented Mar. 25, 1913.
19 SHEETS—SHEET 16.

Witnesses
G. Howard Walmsley
Edward H. Reed

Inventors
Wilfred I. Ohmer,
David B. Whistler,
John E. McAllister,
By
Attorney

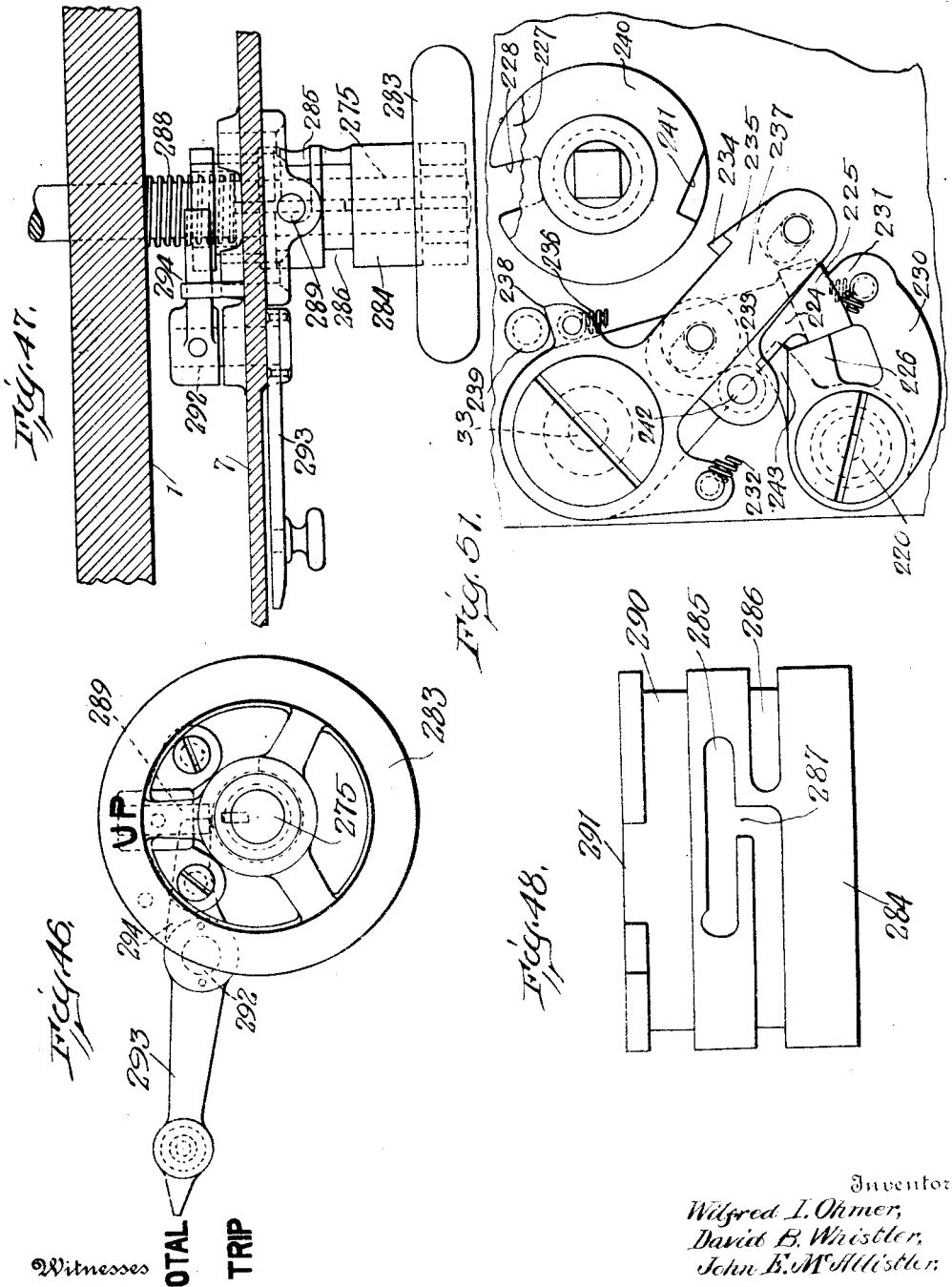

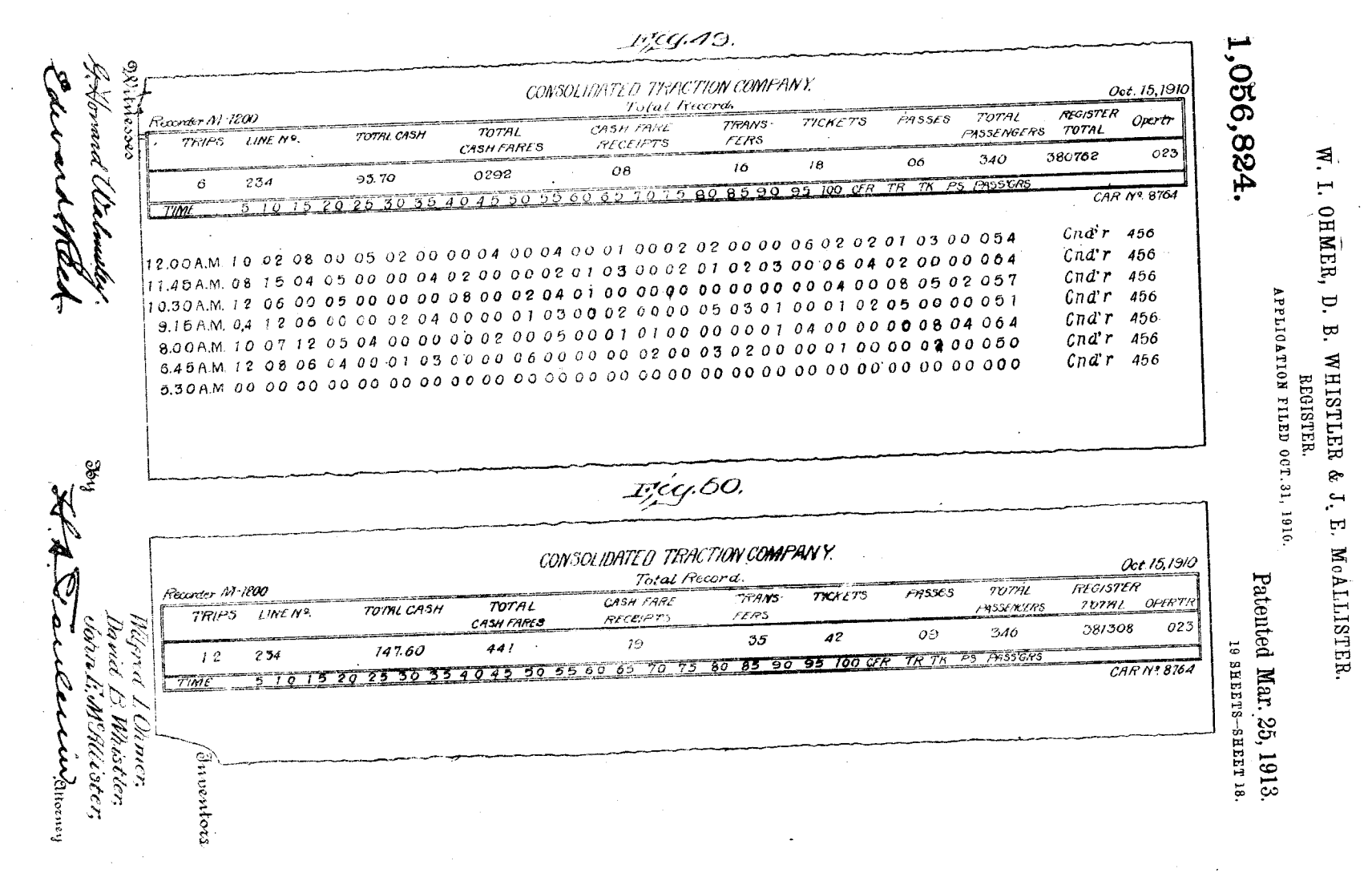

W. I. OHMER, D. B. WHISTLER & J. E. McALLISTER.
REGISTER.
APPLICATION FILED OCT. 31, 1910.

1,056,824.

Patented Mar. 25, 1913.
19 SHEETS—SHEET 18.

Fig. 49.

CONSOLIDATED TRACTION COMPANY.
Total Record.

Recorder N° 1200                                                                    Oct. 15, 1910

| TRIPS | LINE N° | TOTAL CASH | TOTAL CASH FARES | CASH FARE RECEIPTS | TRANS FERS | TICKETS | PASSES | TOTAL PASSENGERS | REGISTER TOTAL | Oper'r |
|---|---|---|---|---|---|---|---|---|---|---|
| 6 | 234 | 95.70 | 0292 | 08 | 16 | 18 | 06 | 340 | 380762 | 023 |

|  |  |  |  |  |  |  |  |  |  |  |
|---|---|---|---|---|---|---|---|---|---|---|
| 12.00 A.M. | 10 | 02 | 08 | 00 | 05 | 02 | 00 | 00 | 04 | Cnd'r 456 |
| 11.45 A.M. | 08 | 15 | 04 | 05 | 00 | 04 | 02 | 00 | 06 | Cnd'r 456 |
| 10.30 A.M. | 12 | 06 | 00 | 05 | 00 | 00 | 08 | 05 | 02 | Cnd'r 456 |
| 10.30 A.M. | | | 00 | 02 | 04 | 01 | 00 | 00 | 00 | Cnd'r 456 |
| 9.15 A.M. | 04 | 12 | 06 | 00 | 00 | 02 | 00 | 05 | 00 | Cnd'r 456 |
| 8.00 A.M. | 10 | 07 | 12 | 05 | 04 | 00 | 00 | 01 | 04 | Cnd'r 456 |
| 6.45 A.M. | 12 | 08 | 06 | 04 | 00 | 01 | 03 | 02 | 00 | Cnd'r 456 |
| 5.30 A.M. | 00 | 00 | 00 | 00 | 00 | 00 | 00 | 00 | 00 | |

TIME 5 10 15 20 25 30 35 40 45 50 55 60 62 70 5 80 85 90 95 100 CFR TR TK PS PASS'RS    CAR N° 8764

Fig. 50.

CONSOLIDATED TRACTION COMPANY.
Total Record.

Recorder N° 1200                                            Oct. 15, 1910

| TRIPS | LINE N° | TOTAL CASH | TOTAL CASH FARES | CASH FARE RECEIPTS | TRANS FERS | TICKETS | PASSES | TOTAL PASSENGERS | REGISTER TOTAL | OPER'R |
|---|---|---|---|---|---|---|---|---|---|---|
| 12 | 234 | 147.60 | 441 | 19 | 35 | 42 | 09 | 340 | 381308 | 023 |

TIME 5 10 15 20 25 30 35 40 45 50 55 60 65 70 75 80 85 90 95 100 CFR TR TK PS PASS'GRS    CAR N° 8764

Witnesses
G. Howard Walmsley
Edward Reed

Inventors
Wilfred I. Ohmer
David B. Whistler
John E. McAllister
By _____ Attorney

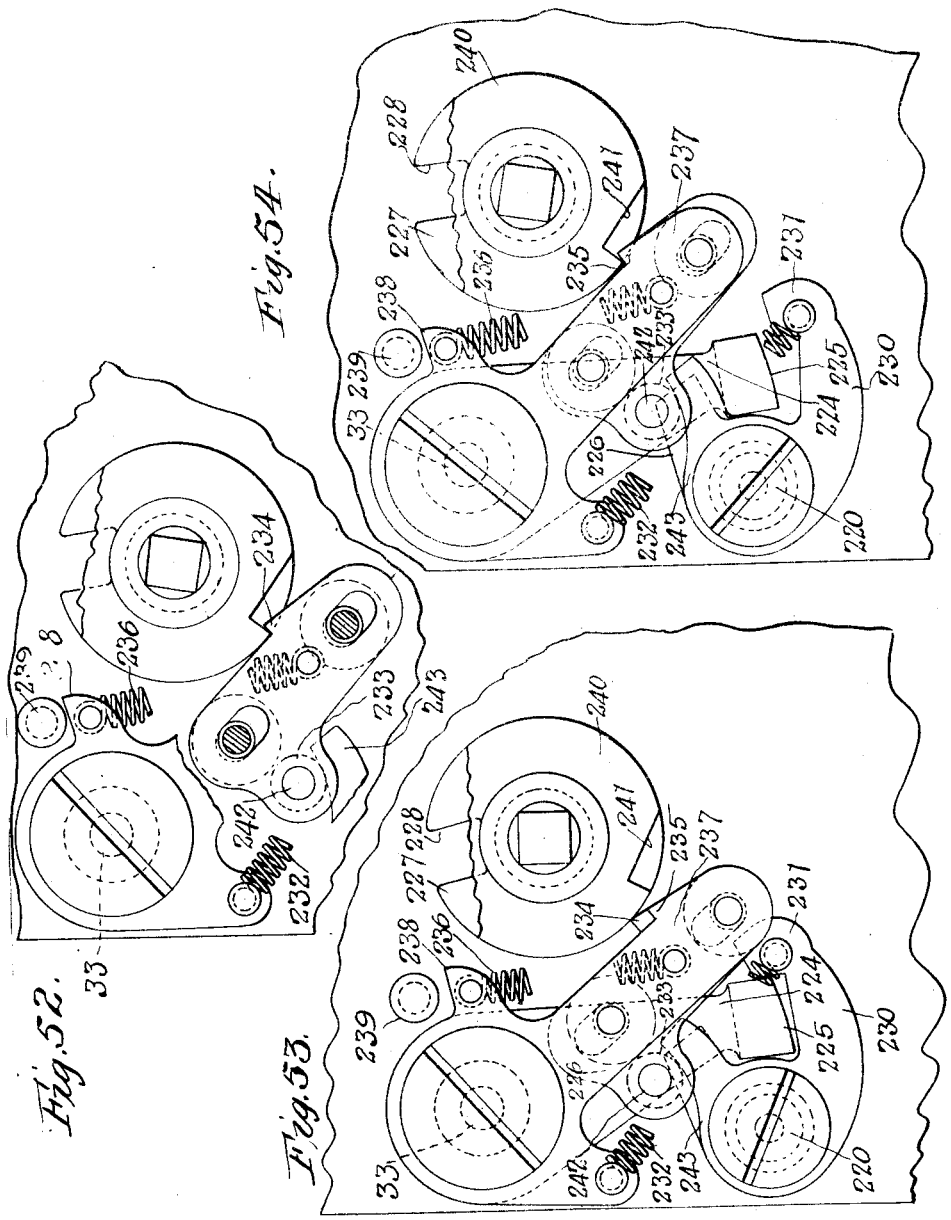

UNITED STATES PATENT OFFICE.

WILFRED I. OHMER, DAVID B. WHISTLER, AND JOHN E. McALLISTER, OF DAYTON, OHIO, ASSIGNORS TO THE RECORDING AND COMPUTING MACHINES COMPANY, OF DAYTON, OHIO, A CORPORATION OF OHIO.

REGISTER.

1,056,824. Specification of Letters Patent. Patented Mar. 25, 1913.

Application filed October 31, 1910. Serial No. 589,955.

*To all whom it may concern:*

Be it known that we, WILFRED I. OHMER, DAVID B. WHISTLER, and JOHN E. McALLISTER, citizens of the United States, residing at Dayton, in the county of Montgomery and State of Ohio, have invented certain new and useful Improvements in Registers, of which the following is a specification, reference being had therein to the accompanying drawings.

This invention relates to registers and more particularly to fare registers for use on interurban cars.

On the cars in interurban service a large variety of fares are collected including a plurality of paper or ticket fares and numerous cash fares, ranging from five cents to one dollar, and sometimes higher, in multiples of five.

The object of the invention is to provide a register which will count and register the number of fares of all kinds collected during a given trip, the number of paper fares of each kind; and the number of cash fares of each denomination; which will compute and register a total record of all the fares collected for a given period, including a plurality of trips, this total record to include the total number of fares of all kinds collected, the total number of ticket fares of each class, the total number of cash fares of all classes, and the total amount of cash collected; and which will also compute and register a second total or accumulator record similar to but independent of the first total record, this second total or accumulator record to cover a longer period than the first total record, such, for instance, as the record of the day's work when the car has been in charge of two or more conductors during the day and each conductor has printed a total record.

To this end it is also an object of the invention to provide means for adding to the total cash counter for the total record each cash fare registered regardless of its denomination, which mechanism will be controlled by the manipulation of the machine to register a fare in the ordinary manner; and also to provide means for rendering the actuating mechanism for the total cash counters inoperative when a ticket fare is registered.

It is a further object of the invention to provide means for registering and printing on the trip record the time at which the record was taken and the number or identifying mark of the conductor or other person taking the record and to register and print on the total and accumulator records the number of trips made, the number of the line or division of the railroad upon which the car is operating and the identifying mark of the person taking this record.

It is also an object of the invention to provide a machine of this character which will be comparatively simple in its construction, positive in its operation and compact in its arrangement and form and to provide the operating mechanisms of such a character that they will be strong and durable and little liable to disarrangement which would render the machine inaccurate or inoperative.

It is also an object of the invention to provide a system of locks which will necessitate the several operations of the machine to be performed in their proper order and will prevent any manipulation of the machine to cause it to produce a garbled or inaccurate record.

Figure 45:
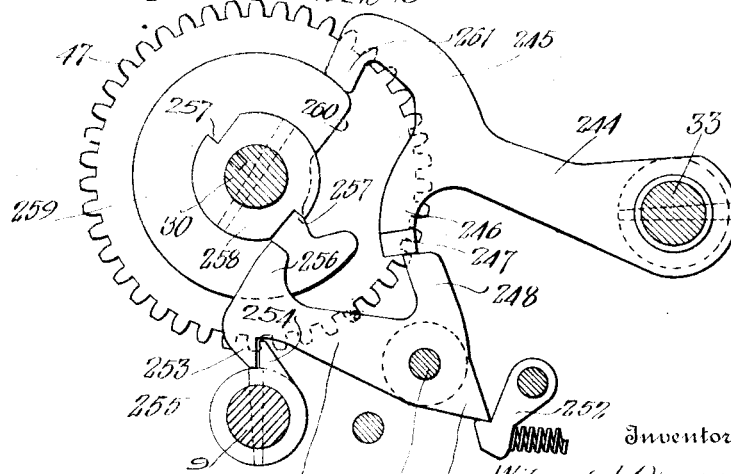

In the accompanying drawings, Figure 1 is a top plan view of a register embodying our invention with the cabinet removed; Fig. 2 is an elevation of the right hand end of the machine with the cabinet removed; Fig. 3 is a similar view of the left hand end of the machine; Fig. 4 is a transverse, sectional view taken just inside the frame member at the right hand end of the machine; Fig. 5 is a front elevation of the upper portion of the machine with certain parts broken away; Fig. 6 is a vertical, sectional view of the upper portion of the machine taken immediately in front of the rear or total counters and their actuating devices; Fig. 7 is a side elevation of the actuating gear for the tens counter of the total cash counting devices and its controlling mechanism; Fig. 8 is a front elevation of the same; Fig. 9 is a top, plan view of the right hand end of the machine; Fig. 10 is a similar view of the left hand end of the machine; Fig. 11 is an edge view of the controlling cam for the tens counter of the total cash registering devices; Fig. 12 is a side elevation of such cam; Fig. 13 is a development of the cam shown in Figs. 11 and 12; Fig. 14 is an edge view of the controlling cam for the units counter of the total cash registering devices; Fig. 15 is a side elevation of the same; Fig. 16 is a development of the cam shown in Figs. 14 and 15; Fig. 17 is a development of the controlling cam for the actuating mechanism for the ticket registering devices; Fig. 18 is a side elevation of that cam; Fig. 19 is an edge view of the cam shown in Figs. 17 and 18; Fig. 20 is a section taken on the line c c of Fig. 21 and looking in the direction of the arrows; Fig. 21 is a transverse, sectional view showing the actuators for the unit counters of the total cash registering devices for the total and accumulator records; Fig. 22 is a transverse, sectional view showing in elevation the actuator for the device which registers the total number of cash fares; Fig. 23 is a plan view of the mechanism on the outside of the frame member at the right hand end of the machine; Fig. 24 is a front elevation of the same; Fig. 25 is a vertical, sectional view taken on the line a a of Fig. 2 and looking in the direction of the arrows; Fig. 26 is a top, plan view of the mechanism on the outside of the frame member at the left hand end of the machine; Fig. 27 is a rear elevation of the mechanism shown in Fig. 26; Fig. 28 is a rear elevation of the mechanism shown in Fig. 23; Fig. 29 is a front elevation of the trip number counting mechanism; Fig. 30 is a side elevation of the same; Fig. 31 is a front elevation of the time registering mechanism; Fig. 32 is a side elevation of the same; Fig. 33 is a side elevation of the line or division number registering devices; Fig. 34 is a front elevation of the same; Fig. 35 is a side elevation of the direction indicator mechanism; Fig. 35ª is a similar view showing the indicator in a different position; Fig. 36 is a front elevation of the same; Fig. 36ª is a similar view with the casing and shutter removed; Fig. 37 is a front elevation of the actuator for the unit counter of the total cash registering devices; Figs. 38 and 39 are side and edge views, respectively, of the actuator for the total passenger counters; Figs. 40 and 41 are side and edge views, respectively, of the actuator for the ticket fare counters; Figs. 42 and 43 are side and edge views, respectively, of the actuator for the counters registering the total number of cash fares; Fig. 44 is a transverse, sectional view taken on the line b b of Fig. 6 and looking in the direction of the arrows; Fig. 45 is a detail view of the locking device for the accumulator; Fig. 46 is a side elevation of the actuating device for the printing mechanism; Fig. 47 is a plan view of the same; Fig. 48 is a development of the cam forming a part of this mechanism; Fig. 49 is a representation of the conductor's record taken at the end of the run, showing the several trip records and the total record for the run; and Fig. 50 is a representation of the daily total or accumulator record taken at the end of the day and showing the total record for the several runs made during the day; Figs. 51, 52, 53 and 54 are detail views of the locking mechanism for the accumulator showing the same in different positions.

In these drawings we have illustrated one embodiment of our invention and have shown the same as applied to a register comprising the end members 1 and 2 connected one to the other by longitudinal tie bars or frame members 3, 4, 5 and 6. The entire mechanism is supported by this frame and is inclosed within a cabinet 7. This cabinet forms no part of the invention and is omitted from the most of the drawings, portions of it, however, are shown in Figs. 23, 24, 28 and 47. The three sets of registering devices, i. e., the trip registering devices, the total registering devices and the accumulator registering devices, are mounted between the two end members of the main frame. As here shown the trip and total counters comprise resetting shafts 8 and 9, respectively, journaled in the end members of the frame and held normally against movement. Mounted on each resetting shaft is a series of groups of counting wheels, each group comprising a counter or registering device. These counters are of ordinary construction and each counting wheel comprises a type wheel 10 having rigidly connected thereto and usually pinned to the side thereof a gear 11. The first or unit counter is actuated by a suitable actuator to add the desired number of units thereto, and, when the unit counter has been advanced ten points the count is transferred through suitable mechanism to cause the tens counter to advance one point. This is the usual operation of counters or registering devices of this character and the mechanism for accomplishing the same may be of any suitable type and that here shown is well known and need not be illustrated or described in detail. Suffice it to say that it comprises the usual transfer gears 12 and 13 arranged on transfer shafts 14 and 15 extending parallel with and in the front and rear of the trip and total resetting shafts, respectively. The transfer mechanism for the rear or total counters has been slightly modified and these changes will be described in connection with the accumulator controlling mechanism.

The front or trip counter shaft 8 has mounted thereon twenty-four groups of counter wheels, each of which is adapted to register a different fare. Twenty of these counters are adapted to register cash fares, from five cents to a dollar, in multiples of five. These trip cash counters are indicated at 16. The remaining four fare counters are adapted to take care of the paper or ticket fares and are here indicated by the reference numeral 17. The character of the fares registered on these four ticket fare counters may be varied according to the requirements of the particular road using the register. As here shown, they are designed to register passes, regular tickets, transfers and cash fare receipts. A suitable actuator is provided for actuating the desired one of these twenty-four counters to register the particular fare which has been received. This actuator preferably comprises a gear 18 slidably mounted on an actuator shaft 19 and held against rotary movement relatively thereto, this being accomplished, in the present instance, by the usual pin and groove connection between the hub of the gear and the shaft. This actuator is adapted to be moved into alinement with the gear 11 of the unit counter wheel of any one of the registering devices and then actuated to impart movement to that counter wheel. In the present instance the mechanism for shifting the actuator from one position to another comprises a screw shaft 20 rotatably mounted in the end members of the main frame and having mounted thereon a carriage comprising a nut or body portion 21 and a depending yoke 22. This yoke comprises two arms adapted to extend on opposite sides of the hub of the actuator 18 and bifurcated to straddle the actuator shaft 19. By means of this construction the carriage is held against rotation with the screw shaft and caused to travel longitudinally thereof when this shaft is rotated and this movement of the carriage causes the actuator to move longitudinally to the counter shaft 8. The screw shaft may be actuated in any suitable manner, and, as here shown, it extends beyond the end member of the frame and is adapted to be connected with a suitable operating mechanism mounted in the car and forming no part of the present invention. Rotary movement is imparted to the actuator shaft 19 and the actuator by suitable mechanism which will be hereinafter described. Suffice it to say at this time that this mechanism is such as to impart a half revolution to the actuator on each operation thereof, and, consequently, the actuator is here shown as a two tooth gear, one tooth of which will engage the gear of one of the counter wheels upon each operation of the actuator and thus advance that counter wheel one point. In addition to the counters or registering devices for registering the number of fares of each class received there is mounted on the trip counter shaft 8 a counter or registering device adapted to register the total number of fares of all classes received during the trip, thus registering the number of passengers carried, each passenger having paid a single fare. To this end this trip passenger counter, which is indicated at 23, must be advanced one point for each half revolution of the actuator shaft 19. This is accomplished by mounting a two toothed actuator 24 upon the actuator shaft 19 and fixing the same in permanent alinement with the gear of the unit counter wheel of the trip passenger counters.

The rear or total counter shaft 9 has mounted thereon counters or registering devices adapted to register the totals of the items registered by the trip counter shaft during a given period of time. This period of time will include a plurality of trips. It will be understood, however, that the periods covered by each counter shaft may be determined according to the needs of the particular railroad which is operating the register. If desired, the counters on the front counter shaft, which is here designated as the trip counter shaft, could be utilized to register the number of fares received between two given stations. The rear counters, which are here designated as the total counters and register the totals of the items registered on the front counters during the time the car was in charge of a single conductor, could be utilized to register the totals of the several stations covered by a single trip. And the accumulator, which is here used to register totals for the day or other period of time during which the car has been in charge of two or more conductors, could be utilized either to register the daily totals or totals for each conductor.

The rear or total counter shaft contains counters or registering devices to register the total number of passengers carried during the several trips included within the total record, as indicated at 25; the total number of ticket fares of each class, as indicated at 26; the register total of all fares received, i. e., a grand total of all fares registered by the machine without regard to any period of time, as indicated at 27; the total number of cash fares of all denominations received during the period covered by the total record, as indicated at 28; and the total amount of cash received during such period, as indicated at 29. Each of these counters or registering devices has a separate actuating device with the exception of the ticket fare counters and these are controlled by a single actuating device. The actuating devices or actuators for the rear or total counters are mounted on a rear actuating shaft 30 arranged above the rear counter shaft.

The accumulator comprises a series of registering devices adapted to register the same items as are registered by the total counters and further adapted to be reset independently of the total counters, thereby enabling the accumulator to compute the total for a period greater than that covered by the to tals computed by the total counters. In the form of device here shown this accumulator comprises a resetting shaft 31 journaled in arms 32 rigidly secured near the opposite ends of the machine to a shaft 33 rotatably mounted in the end members of the main frame. These arms are normally held in their elevated position, which, in the present instance, is substantially horizontal, by means of a spring 34 secured to the tie bar 3 and having one end extending beneath a part of one of the arms. Mounted upon this resetting shaft are a plurality of counters.

In the present machine it is not desired to print the record directly from the accumulator counters and we have, consequently, omitted the counter wheels from these counters and have formed the same of gears only. These gears are arranged in the same manner and provided with transfer mechanism of the same character as are the trip and total counters, this transfer mechanism being shown as comprising transfer wheels 35 carried by a transfer shaft 36 mounted in the end members of the main frame. The accumulator counters are actuated by actuators mounted on the actuator shaft 30, these actuators being preferably identical with those for the total counters, their arrangement being such that they will actuate the accumulator counters simultaneously with the actuation of the total counters. In this manner the same item and the same amounts are added to the accumulator that are added to the trip and total counters. When it is desired to take a record from the accumulator the counters thereof are operatively connected with the total counters and are then reset, thereby transferring to the total counters the count that has been accumulated thereby. To so connect the accumulator counters with the total counters an intermediate gear 37 is interposed between the transfer gear 13 for each total counter wheel and the corresponding accumulator counter wheel. The several gears 37 are mounted on a shaft 38 and are normally in mesh with the transfer gears 13 and out of mesh with the gears of the accumulator counters. When it is desired to transfer the count from the accumulator counters to the total counters the total counters are first reset to zero and the accumulator counters are then moved down to bring the gears thereof into mesh with the respective gears 37 on the shaft 38. The resetting shaft 31 is then actuated to reset the accumulator counters to zero, thereby transferring a record to the total counters. The shaft 31 is held against backward rotation by a pawl 300 mounted on a fixed part of the machine and engaging a ratchet wheel 301 secured to the shaft.

As has been stated the trip counters register the number of cash fares of each denomination received, while the total and accumulator counters register the total number of fares of all denominations received and compute the total amount of cash received. Mechanism is, therefore, provided which is controlled by the setting and operating of the actuator for the trip counters to set and operate the actuators for the total and accumulator counters. In the case of the total cash counters this mechanism is so controlled that the total cash counter and accumulator cash counter will be advanced a distance corresponding to the amount of the particular cash fare which has been registered. To facilitate this operation the total cash counters, of both the total counters and the accumulator counters, are so arranged that both the units counter wheel and the tens counter wheel are adapted to be directly actuated from the actuator shaft, thus enabling the fares to be added directly to the tens counter wheel in multiples of ten, and where the fare registered is not a multiple of ten the odd cents are added to the units counter wheel. It being understood that the accumulator counters are similar in arrangement to the total cash counters and are actuated in the same manner, the description of this mechanism and its operation will be confined to the total counters. The tens counter wheel 39 of the total cash counters 29 has a gear 40 rigidly secured to the hub thereof and meshing with an actuator gear 41 mounted on the actuator shaft 30. A companion gear 42 mounted on the shaft 30 actuates the tens counter wheel for the corresponding accumulator counter. The units counter wheel 43 is connected by the usual transfer mechanism with the gear 40 of the tens counter wheel and has secured to the hub thereof a gear 44 which is adapted to be actuated by an actuator 45 mounted on the actuator shaft 30. A companion actuator 46 controls the corresponding accumulator counter. The actuators 45 and 46 are slidably mounted on the shaft 30 and held against rotation relatively thereto, preferably by having their hubs keyed to the shaft. When the fare includes a five cent fare the actuators are moved into alinement with the gears of the counter wheels and the actuation of the shaft 30 causes both the tens counter wheel and the units counter wheel to be actuated. When the fare is a multiple of ten the actuators 45 and 46 are moved out of alinement with the gears of their respective counter wheels, and, consequently, the operation of the shaft 30 does not affect the units counter wheels. The fares collected are either in multiples of ten or multiples of five. Consequently, the actuators 45 and 46 are shown in the form of five toothed segments and, therefore, each operation of the shaft 30 when the actuators 45 and 46 are in alinement with the gears of their respective counter wheels will cause those counter wheels to be advanced five points. Inasmuch as the actuator shaft 30 advances but a half revolution for each operation thereof each actuator is here shown as comprising two segments which alternately engage their respective gears.

The mechanism for controlling the actuators for the units and tens counter wheels may, of course, be of any suitable character and is, in the present instance, shown as cam controlled mechanism. The cam, as here shown, comprises a disk 47 rigidly secured to the actuator shaft 30 and having formed in the periphery thereof a groove of the desired shape. Rigidly connected with the cam 47 is a gear 48 which meshes with a pinion 49 mounted on a cam actuating shaft 50 mounted in the end members of the main frame. The pinion 49 is loosely mounted on the shaft 50 and is connected by means of a sleeve 51 with a gear 52 also loosely mounted on the intermediate shaft 50 and meshing with a pinion 53 rigidly connected with the setting of screw shaft 20. An arm 54 is pivotally mounted on the tie bar 3 of the main frame and extends inwardly therefrom, having at its inner end a pin 55 extending into the groove of the cam disk 47. The outline of this cam groove is shown in Figs. 11 and 13 and it will be noted that it consists of two straight portions of different lengths, one of which is laterally offset from the other. The ratio of the gearing connecting the cam with the screw shaft is such that when the screw shaft has been actuated to move the actuator for the trip counters into operative relation with any cash fare counter other than the five cent fare counter the pin 55 of the arm 54 will rest in the longer portion of the groove.

When the actuator for the trip counters has been moved into operative relation with one of the ticket fares or with the five cent cash fare the pin will lie in the shorter portion of the groove, and, as the pin moves from one portion to the other of the groove, the arm or lever 54 will be moved about its pivotal center. This lever is so connected with the actuator for the tens counter wheel of the total and accumulator counters that when the pin is in the longer portion of the groove the actuators for the tens counter wheels will be operatively connected with the actuator shaft, and when the pin 55 is in the shorter section of the cam groove and the trip counter actuator is in operative relation with a ticket fare or the five cent fare, the actuators for the tens counter wheels will be disconnected from the actuator shaft.

The lever or arm 54 is connected by means of a link 56 with a second arm or lever 57 also pivotally mounted on the tie bar 3 and extending inwardly. A pin 58 carried by the inner end of the second arm or lever 57 extends into a grooved collar 59 to which is rigidly secured a gear 60 rotatably and slidably mounted on the shaft 30. This gear meshes with and is actuated by a pinion 61 rigidly secured to the shaft 50 and is of a width somewhat greater than the width of the gear 60 to permit that gear to move relatively to the pinion without becoming disengaged therefrom. The gear 60 has two laterally extending projections 62 rigidly secured thereto at diametrically opposite points on the side thereof. Loosely mounted on the shaft 30 are two similar ratchet wheels 63 and 64.

The ratchet wheel 63 is connected by means of a sleeve 65 with the actuator gear 41 for the total cash counters for the total record. The ratchet wheel 64 is connected by a sleeve 66, which is rotatably mounted on the sleeve 65, with the actuator gear 42 for the tens counter wheel of the accumulator cash counter. The actuator gears 41 and 42 are held against lateral displacement and are always in mesh with the gears of their respective counter wheels. A single pawl 67 serves to actuate both ratchet wheels, 63 and 64, and is pivotally mounted on one arm of a plate 68 which is rigidly secured to the actuator shaft 30. The pawl 67 has a laterally extending projection or finger 69 which is arranged in a position to engage the projection 62 of the gear 60 when the trip counter actuator is set to actuate a cash fare other than a five cent fare, it being understood that the gear 60 will be moved longitudinally to the shaft 30 through its connection with the arm 54 and the cam 47. The shaft 50 is rotated by means of an eight point gear 70 rigidly secured thereto at the end opposite the end carrying the gear 52 and meshing with a two point gear 71 rigidly secured to the screw shaft 20. (Fig. 3.) The rotation of the shaft 50 and gear 61 will actuate the gear 60 to move the projection 62 toward or away from the pawl 67 according to whether the trip counter actuator is being moved toward a larger or smaller fare. In the position shown in Fig. 7 the trip counter actuator is set in operative relation to the dollar fare and the projection 62 is in its position nearest to the normal position of the pawl 67. The plate 68 is rigidly secured to the actuator shaft, and, when this shaft is actuated, the pin 69 will engage the projection 62 and press the nose of the pawl into engagement with the teeth of the ratchet wheel and the further movement of the plate and the pawl will actuate the ratchet wheels and the actuator gears which are secured thereto. As has been stated the actuator shaft 30 makes a half revolution on each operation thereof. Consequently, there are two of the projections 62 and the ratchet wheels are adapted to be rotated through a half revolution upon each operation thereof. In the present instance these actuator wheels have twenty-four teeth. They are adapted to advance but ten points only as the counter wheels are ten point wheels. The extra four teeth, two for each half of the gear, are to afford sufficient space within which the pawl 67 may be moved into engagement with the ratchet wheels.

It will be obvious that with the parts in the position shown in Fig. 7 the engagement of the pin of the pawl with the projection 62 would not depress the pawl quickly enough to cause it to engage the first tooth and we find it more advantageous to jump two teeth and engage the third tooth. When the pawl has engaged the third tooth the completion of a half revolution of the plate carrying the pawl will advance the ratchet wheels 10 points and will, consequently, advance the counter wheels ten points. If the fare is smaller than one dollar the projection 62 will have been moved away from the pawl 67 and into such a position that it will cause the pawl to engage the proper teeth of the ratchet wheels to advance the counter wheels the desired distance. If the fare to be registered is a ten cent fare then the projection 62 will be advanced to such a position that the pawl will be moved into engagement with the last teeth on those halves of the wheels and the ratchet wheels will be advanced but one tooth. Means are also provided for retaining the pawl in engagement with the ratchet wheel after the pin 69 has passed the projection 62. To this end the pawl is provided with a tail 72 which is provided with a laterally extending projection or shoulder 73.

The rearwardly extending projection or tail 72 of the pawl is connected by a spring 74 with a pin 75 mounted on another portion of the plate 68 which carries the pawl and serves to normally hold the pawl out of engagement with the ratchet. A second pin 76, also mounted on the plate 68, is arranged in the path of the tail 72 and limits the upward movement of the nose of the pawl, thereby retaining the pin 69 normally in a position to engage the projection 62. A second plate 77 is rotatably mounted on the shaft 30 and has two oppositely extending arms, one of which is provided with a shoulder 78 arranged near the shoulder 73 on the tail of the pawl. The other arm of the plate 77 is connected by a spring 79 with the pin 75 on the plate 68 and tends to move the plate 77 about the axis of the shaft 30, which movement will carry the shoulder 78 toward the shoulder 73. The plate 77 is connected to the plate 68 and allowed a limited movement relatively thereto by means of a pin 80 carried by the plate 68 and extending through a slot 81 in one arm of the plate 77. When the actuator shaft is rotated and the pawl 67 is depressed the shoulder 73 of the tail of the pawl will be elevated and the spring 79 will move the shoulder 78 of the plate 77 beneath the shoulder 73 on the tail of the pawl and the pawl will thus be locked in engagement with the ratchet wheels.

Positively actuated means are provided for releasing the tail 72 of the pawl from the shoulder 78. In the present instance the pawl remains locked until the mechanism is actuated to register another fare, and at the beginning of the succeeding operation of the mechanism, a tripping device operates to release the pawl from its retaining device. This means, as here shown, comprises an arm 82 rotatably mounted on a shaft 83 and having a nose 84 adapted to engage the beveled edge of one of the arms of the plate 77 and move the same about its axis of rotation on the shaft 30 against the tension of the spring 79, thereby moving the shoulder 78 out of alinement with the shoulder 73 and permitting the pawl to be moved about its pivotal center by its spring 74. Movement is imparted to the arm 82 from a driving shaft 85 which controls the operation of the registering devices to register the fare. This shaft is manipulated, in a manner hereinafter to be described, to rock the same through a portion of a revolution and return it to its normal position and has rigidly secured thereto a collar 86 having a projection 87 adapted to engage a part carried by the arm 82 and thus move the arm 82 toward the plate 77 against the tension of a spring 88 connected at one end to the arm 82 and at the other end to the tie bar 3 and tending to hold the arm 82 normally in an inoperative position. The shaft 85 and the projection 87 make two movements and it is desirable that the arm 82 should be operated by but one of these movements. Consequently, that part of the arm 82 which is engaged by the projection 87 is movable, and, as here shown, comprises a pawl 89 pivotally mounted on the side of the arm and having a laterally extending finger 90 rigidly secured thereto and adapted to rest normally in engagement with the stop 91 mounted on the arm 82. A spring 92 connected at one end to the arm 82 and at the other end to the finger 90 tends to hold the finger normally in engagement with the stop 91, and, when the finger 90 is in this position, the tip of the pawl 89 will extend into the path of the projection 87. The first portion of the movement of the shaft 85 will cause the projection 87 to engage the pawl 89 and move the arm 84 downwardly and inwardly a distance sufficient to enable the projection to pass the pawl. This movement will be sufficient to trip the plate 77 and release the pawl 67. Upon the return movement of the shaft 85 the projection 87 will engage the pawl 88 and force the same about its pivotal center against the tension of the spring 92 and thus past the pawl without affecting the position of the arm 82.

It is desirable that the pawl 67 should be disengaged from the ratchet wheels before the rear counter shaft 9 is reset. To this end a plate 93 is loosely mounted on the actuator shaft 30 and has an upwardly extending arm provided with a pin 94 which extends into a slotted arm 95 pinned to the shaft 83 and having a projection 96 arranged to engage a pin 97 mounted on a finger 98 rigidly secured to the arm 82. The plate 93 extends below the shaft 30 and has an arm 99 provided with a nose 100 adapted to enter a notch 101 in a disk 102 rigidly secured to the resetting shaft 9. The nose and notch have their edges beveled. Consequently, the rotation of the disk when the shaft is reset will force the nose 100 of the arm 99 out of the notch and will thus rock the arm 95 and cause the nose 84 of the lever 82 to move inwardly. The lower portion of the plate 93 has a second arm 103, the outer end of which extends into a notch 104 in a disk 105 rigidly secured to the front counter shaft 8. Consequently, this plate will be rocked when either shaft is actuated to reset the counters to zero.

The actuators 45 and 46 for the unit counter wheels of the total cash counters are slidably mounted on the shaft 30 and have connected therewith a grooved collar 106. An arm or lever 107 is pivotally mounted on the tie bar 3 and has at its inner end a pin 108 which enters the groove in the collar 106 and is connected by a link 109 with a second lever 110 also mounted on the tie bar 3 and having at its inner end a pin 111. The pin of the arm 110 extends into the groove of a cam 112 which is loosely mounted on the actuator shaft 30 and has connected thereto a gear 113 which meshes with a pinion 114 rigidly secured to a gear 701 which meshes with a pinion 711 on the setting or screw shaft. The groove of the cam 112 is zigzag for the greater portion of its length and for the remainder of its length is straight, the short straight portion being laterally offset from the zigzag portion. When the setting or screw shaft is rotated to move the actuator along the cash fare counters the pin 111 and the arm 110 will be caused to follow the zigzag portion of the cam groove and the arm 110 will be rocked about its pivotal center, and the five cent actuators which are connected with the arm 110 by means of the arm 107 and link 109 will be reciprocated longitudinal to the shaft 30 and thereby moved into and out of mesh with the gears of the counter wheels for the total cash counters. The arrangement of the zigzag portion of the groove is such that the five cent actuators will be moved out of operative relation with their gears each time the actuator for the trip counters is brought into operative relation with a fare counter for registering a fare of ten cents or a multiple thereof, and, when the fare is not a multiple of ten the five cent actuators will be moved into operative relation with their gears and the operation of the actuator shaft will cause the units counter for the total cash counters to be advanced five points.

The counter 28 for registering the total number of cash fares is adapted to be actuated by a two tooth actuating member 115 which is arranged to engage the gear 116 of the units counter wheel for the total cash fare counter once for each half revolution of the actuator shaft 30, thereby advancing the total cash fare counter one point each time a cash fare is registered regardless of the denomination of the fare. The actuator 115 and its companion 117, for the total cash fare counter of the accumulator, are slidably mounted upon the actuator shaft 30 and are connected with the five cent actuators 45 and 46, and, consequently, are moved in unison with those actuators. The gears for the units counter wheels of the total cash fare counters are of such a width that the actuators will be in alinement therewith whenever the trip counter actuator is set for a cash fare regardless of the amount of the fare. When the trip counter actuator is set in operative relation with a ticket fare, the actuators 115 and 117 are moved out of their operative relation with the gears for the units counter wheels of their respective counters. This is due to the straight laterally offset portion of the groove in the cam 112 which is so arranged that the pin 111 of the arm 110 will enter the same whenever the trip counter actuator is moved into alinement with a ticket fare counter. This movement of the pin into the laterally offset portion imparts a greater movement to the arms 110 and 107, and, consequently, shifts the five cent actuators and the actuator for the cash fare counters a greater distance than they are shifted when that pin rests in the zigzag portion of the cam 112. Obviously, when the actuators 115 and 117 are out of alinement with their respective gears the operation of the actuator shaft 30 will not affect the total cash fare counters.

The four ticket fare counters for the total record are actuated by a single actuator 118 which is slidably mounted upon the shaft 30 and is adapted to be moved into operative relation with that counter corresponding to the ticket counter with which the trip counter actuator is in operative relation. This actuator for the ticket counters is a two tooth actuator similar to those already described and has rigidly secured thereto a grooved hub or collar 119 into which extends a pin 120 carried by an arm 121 pivotally mounted on the tie bar 3. This arm has a laterally extending portion 122 provided with teeth which are segmentally arranged and mesh with corresponding teeth carried by a laterally extending portion 123 of an arm 124 which is also pivotally mounted on the tie bar 3 and has at its inner end a pin 125 which enters the groove in a ticket actuator controlling cam 126. This cam is loosely mounted on the shaft 30 and has rigidly secured thereto a gear 127 which meshes with a pinion 128 loosely mounted on the shaft 50 and connected by a sleeve 129 with the gear 701. The groove of the cam 126, which is here shown in detail in Figs. 17 to 19, comprises a straight portion which extends for the greater portion of the length of the cam and a diagonal zigzag portion. The ratio of the gearing by means of which the cam is connected with the setting shaft is such that when the actuator for the trip counters is in operative relation with a cash fare counter the pin 125 of the arm 124 will lie in the straight portion of the cam groove. When the actuator for the trip counters is moved into operative relation with a ticket fare counter the pin 125 will enter the diagonal zigzag portion of the cam and the arm 124 will be rocked about its pivotal center. The connection between the arms 124 and 121 is such that the arm 121 will be moved in a direction opposite that in which the arm 124 is moved. Consequently, as the pin 125 moves outwardly in the diagonal portion of the groove the actuator 118 will be moved away from the cam and into alinement with the total ticket fare counter corresponding to the trip ticket fare counter with which the trip actuator is in operative relation. The actuator for the register total counter 27 is rigidly secured to the actuator shaft 30, as indicated at 130, and advances this counter one point for every fare registered regardless of its class or denomination.

In addition to the several fare counters there is also mounted upon the trip counter shaft a device to register and to print on the record the time at which the record is taken and a device for printing on the record a number or other mark to identify the conductor or other person who takes the record. The time registering device comprises a counter 131 similar to the fare counters with the exception that each counter wheel is operated independently of the other counter wheels and the count is not transferred from one of said wheels to any of the others. Mechanism for setting these counters to register the time is shown in Figs. 31 and 32 and comprises a series of segments 132 rotatably mounted on the setting shaft 20 beyond the screw-threaded portion thereof. The segments 132 are connected by gears or segments 133 with a second group of segments 134 mounted on the actuator shaft 19 and meshing with the gears of the respective counter wheels 131. Idle gears 135 are mounted on the transfer shaft 14 and mesh with the gears of the counter wheels. Retaining and alining pawls 136 mesh with these idle gears and serve to retain the counter wheels in printing position. Each segment 132 has an arm 137 which is connected by a link 138 with one arm of a bell crank lever 139. The other arms of the bell crank lever extend forwardly beyond the face of the cabinet and by manipulating the same movement can be imparted through the several segments to the respective counter wheels and these counter wheels set in a position to indicate the time. The identifying device comprises a series of counter wheels 140 adapted to be actuated by the conductor's key to set the counter wheels to register the number of the particular key. Identifying devices of this character are well known and it is not necessary to either show or describe the same.

The rear or total counter shaft 9 has mounted thereon a trip number counter 141 and a line or division number counter 142 and is also provided with an identifying device 143 similar to that on the front counter shaft. Both the total counter shaft and the accumulator shaft are provided with trip counting devices, the accumulator counter being indicated at 144 in Fig. 30. A suitable actuator 145 is provided for actuating the trip number counters each time the trip counter shaft is reset. As here shown this actuator comprises a three point gear loosely mounted on the rear actuator shaft 30 and so arranged that each movement thereof will cause one of its teeth to actuate the trip number counter on the total counter shaft and another of its teeth to actuate the trip number counter on the accumulator shaft. This three point gear is rigidly secured to a driving gear 146 which meshes with an idle gear 147 loosely mounted on the front actuator shaft 19 and meshing with a gear 148 rigidly secured to the front or trip counter shaft 8. Consequently, each time the trip counter shaft is rotated to reset the trip counters to zero movement will be imparted to the actuator 145 and this movement will be sufficient to cause the actuator 145 to advance the trip number counters one point.

The line or division number counters 142 are very similar in construction and operation to the time registering device and comprise a series of independent counter wheels mounted on the rear counter shaft. The gear of each of the counter wheels of the line or division number counters meshes with a segment 149 loosely mounted on the rear actuator shaft 30 and having a gear or segment 150 which meshes with a segment 151 loosely mounted on the shaft 50. Each segment 151 has an arm 152 which is connected by a link 153 with one arm of a bell crank lever 154, the other arm of which extends beyond the face of the cabinet to enable the same to be manipulated and the counter wheels set to register the desired number. A suitable visual indicator is also provided to indicate to the passengers within the car the amount of the fare registered. In the present instance this indicator is shown as comprising a ribbon 155 having on one face thereof a series of indications corresponding to the several fare counters on the trip counter shaft and having its opposite ends connected, respectively, to drums 156 and 157 mounted on vertical shafts 158 and 159 carried by brackets 160 mounted on the tie bar 6 of the main frame. These drums are operatively connected with the setting shaft 20 and this connection is such that the rotation of the setting shaft will so actuate the ribbon 155 that the indication on that portion thereof which registers with the slight opening in the cabinet will correspond to the fare counter with which the actuator 18 is in operative relation. This connection, as here shown, comprises a shaft 161 mounted in bearings carried by the brackets 160, connected with the shafts 158 and 159 by bevel gears 163 and 164, and having secured thereto a gear 162 meshing with the gear 52, which, in turn, meshes with the gear 53, rigidly secured to the setting shaft 20. See Fig. 32. That portion of the ribbon 155 which is in front of the sight opening is preferably maintained in a position substantially parallel with the face of the machine by passing the same from the periphery of the drum about a roller 165 mounted on the tie bar 6. The ribbon 155 is of considerable length, and, consequently, as the same is wound from one drum to the other the relative diameters of these drums will vary and the speed with which the ribbon is moved by the two drums will likewise vary. A suitable take-up device is, therefore, provided to compensate for this variation in the movement of the ribbon. This take-up device, as here shown, comprises a roller 166 mounted on an arm 167 which is pivotally mounted on the tie bar 6 and the pivotal axis of which is preferably coincident with the axis of the roller 165. The ribbon passes from the drum 157 in the rear of the drum 156, about the rollers 165 and 166 and about the drum 156. A spring 168 connected at one end to the arm 167 and at the other end to the tie bar tends to move the roller 166 away from the drum 156 and thereby maintains the ribbon taut at all times and permits the roller 166 to yield sufficiently to compensate for the variations in the movement of the ribbon.

The register may be provided with a visual passenger indicator which is advanced one point for each fare registered and thus indicates the total number of passengers carried during a single trip. This indicator is shown at 169 and is operatively connected with the passenger counter on the trip counter shaft and is advanced and reset in unison with that counter. This indicator and its operating mechanism are substantially the same as that shown in our co-pending application, Ser. No. 493,586, filed May 3, 1909, and need not, therefore, be here shown or described in detail. A direction indicator is also provided to indicate the direction in which the car is traveling at the time the fare is registered. This indicator will be changed each time the trip counters are reset to zero and the indication may also be changed without resetting the trip counters. In its main features of construction the indicator corresponds substantially to that shown and described in the above mentioned application, differing therefrom only in minor details of construction. As shown in Figs. 35 and 36 the indicator comprises a segmental plate 170 having near the upper edge thereof the words "In" and "Out" and near the lower edge thereof the words "Out" and "In." The cabinet 7 which incloses the machine is provided with a sight opening 312 of sufficient size to permit the two words at either edge of the segmental plate to be simultaneously brought into alinement therewith. In order that but a single word may be visible to the passengers means are provided for reducing the size of the sight opening and this means may be moved from one end of the opening to the other so that either the word "In" or the word "Out" may be exposed to view, thus enabling the conductor to control this indication at will and without the necessity of resetting the counters. In the present construction a shutter 323 is pivotally mounted at a point beneath the sight opening 312 and extends upwardly across the same. The movement of the shutter is limited in each direction by stops 314. When the shutter is in engagement with either of the stops 314 it will extend in front of the word on that side of the plate adjacent to the stop and will conceal the same from view. When it is moved into engagement with the other stop it will extend in front of the other word and the word which was formerly concealed will be exposed to view. The movement of the shutter may be accomplished in any suitable manner but we have here shown it as rigidly secured to a short shaft 315 which is journaled on the cabinet and is provided on its outer end with a milled head 316 by means of which it may be rotated.

The segmental plate 170 is carried by an arm 171 loosely mounted on the shaft 172, which may also carry the passenger indicator. An arm 173 is rigidly connected with the arm 171 and has a pin 174 which is adapted to be engaged by a pin 175 carried by a gear 176, which gear is actuated through a suitable train of gearing from a mutilated gear 177 rigidly secured to the trip counter shaft 8 and adapted to be actuated each time this shaft is actuated to reset the counters thereon. The mutilated gear 177 will cause the gear 176 to be rotated through a half revolution each time the trip counter shaft is reset. The pin 175 is so arranged on the gear 176 that upon one-half revolution of the gear 176 the pin 175 will engage the pin 174 and move the arms 173 and 171 about the axis of the shaft 172 and thus shift the indicator. The pins remain in engagement until the resetting shaft is again actuated when the pin 175 is moved past the pin 174 and the indicator plate moves into its lower position. A spring 178 is rigidly connected to the main frame and to the arm 171 and serves to hold the plate in its adjusted position and prevent the vibration thereof, as well as to facilitate the downward movement of the plate when the pin 175 passes beyond the pin 174.

The actuating movement is imparted to the several actuators by the actuating shaft 85 which is rotatably mounted in the end members of the main frame and which extends beyond the main frame and the cabinet therefor and which is operated by a suitable mechanism located within the car. This latter mechanism may be of any well known character and is not here shown. Suffice it to say that this mechanism is such as to impart a rocking motion to the shaft 85, which is moved through approximately a quarter of a revolution in one direction and then returned to its normal or home position. This movement is transmitted to the rear actuator shaft 30 by means of two segmental gears 179 and 180 rigidly secured to the shaft 85. The segmental gear 179 meshes with a gear 181 loosely mounted on the actuator shaft 30 and having rigidly secured thereto a plate 181ˣ having mounted thereon two pawls 182 adapted to engage the teeth of a ratchet wheel 183 which is rigidly secured to the shaft 30. This ratchet wheel is here shown as having four teeth and is secured to the shaft in such a position that when the parts are in their idle or normal positions the points of the pawls 182 will be some distance removed from their respective teeth of the ratchet wheel, thus permitting the shaft 85 to be rotated through a portion of its movement before the actuator shaft begins to move. The segmental gear 180 meshes with an idle gear 184 which, in turn, meshes with a gear 185 loosely secured to the shaft 30 and corresponding to the gear 181. This gear has rigidly secured thereto a plate 185ˣ having two pawls 186 which are adapted to engage the teeth of a ratchet wheel 187 rigidly secured to the shaft 30. The relative positions of the pawls and the ratchet teeth are such in this instance also that when the parts are in their normal or idle positions, the noses of the pawls will be at a distance from the respective teeth of the ratchet wheel. By means of this double clutch arrangement it will be apparent that upon the first portion of the movement of the shaft 85 the segment 179 will drive the actuator shaft, and the pawls 186 which are driven by the segmental gear 180 will ride over the teeth of the ratchet wheel. Upon the second or return movement of the shaft the pawls 182 driven by the segmental gear 179 will ride over their teeth and the pawls 186 will engage the teeth of the ratchet wheel and rotate the shaft. Owing to the interposition of the idler 184 between the gear 180 and the gear 185 the direction of movement of the shaft will be the same as when it was actuated by the segmental gear 179 upon the first movement of the shaft 85, the shaft 30 being thus rotated always in the same direction and the total amount of movement imparted thereto being substantially a half revolution. Movement is transmitted from the rear actuator shaft to the front actuator shaft 19 by means of a gear 387 rigidly secured to the actuator shaft 30, preferably at the left hand end of the machine, as shown in Fig. 3, and meshing with an idle gear 188 which, in turn, meshes with a gear 189 rigidly secured to the actuator shaft 19.

Suitable mechanism is provided to prevent the overthrow of the actuator shaft and to limit the movement thereof upon each portion of the movement of the operating shaft 85 to a quarter of a revolution. This mechanism, as here shown, comprises four stops spaced equal distances about the circumference of the shaft, and, in the present instance, consisting of a plate 190 in the shape of a ratchet wheel and rigidly secured to the shaft 30. A finger 191 pivotally mounted on a stud 192 carried by the end member of the main frame is adapted to be moved into and out of the path of the stops or projecting portions of the plate 190. Rigidly connected with the finger 191 is a second finger 193 having rigidly secured thereto a pin 194 which is adapted to enter a cam slot 195 formed in a plate 196 rigidly secured to the shaft 85. The cam slot 195 has its central portion depressed below its end portions and its relation to the pin 194 and the finger 191 is such that when the pin is in either end portion of the slot the finger will be held with its end in the path of the stops on the plate 190, but when the pin enters the lower or depressed portion of the cam slot the end of the finger will be moved out of the path of the stops. When the parts are idle the pin 194 will be in the left hand end portion of the cam slot. At the beginning of the first portion of the movement of the shaft 85 the pin will pass from the end portion to the depressed central portion of the slot, this movement taking place before the pawls 182 have engaged the teeth of the ratchet wheel. Consequently, when the actuator shaft 30 begins to rotate the finger 195 has been moved out of the path of the stop and will not interfere with the rotation of the shaft. When the shaft has advanced a distance sufficient to carry the point of the tooth beyond the end of the finger the pin will enter the opposite end portion of the cam slot and the end of the finger will be moved into the path of the following stop and will positively limit the movement of the shaft 30 to a quarter of a revolution. Upon the return movement of the driving shaft 85 the pin will pass from the end portion to the central portion and thence into the other end portion and operate the finger 191 in the same manner as upon the first portion of the movement of the shaft and the adjacent stop on the plate 190 will be permitted to pass the finger which will then be moved into the path of the following stop.

A suitable arrester is provided to cause the operating shaft 85 to complete its movement in each direction before it can be moved in the opposite direction. This arrester is of ordinary construction and comprises a segmental toothed plate 197 and a radial spring held pawl 198. The operating shaft 85 is held against movement by a suitable key-controlled locking device which makes it necessary for the conductor to insert his key and rotate the same before the operating shaft can be moved and this rotation of the conductor's key sets the identifying device to print his number on the record. This locking device comprises a plate or arm 199 rigidly secured to the shaft 85 and an arm or lever 200 pivotally mounted between its ends on the end member of the main frame and adapted to have one end moved into and out of the path of the plate 199. The other end of the lever 200 is provided with a pin 201 which enters a slot 202 in one arm of a bell crank lever 203, the other arm of which is connected with a lever 204 pivotally mounted between its ends on the main frame and adapted to be actuated by the rotation of the conductor's key to rock the lever 200 about its pivotal center. The construction of the key barrel 205 and the key operated lever 204 are substantially the same as that shown in Patent No. 848,262, granted to us March 26, 1907. Means are also provided and controlled by the movement of the operating shaft 85 for alining the trip counter actuator and retaining the same in proper relation to its counter during the operation of the actuator. To this end the setting shaft 20 has rigidly secured thereto a four point star wheel 209. A lever 210 pivotally mounted between its ends upon the end member of the main frame has a nose or projection 211 adapted to engage the star wheel and move the shaft sufficiently to aline the actuator with the gear of its counter and retain the same in that position during the operation of the machine to register a fare. The nose 211 is normally out of engagement with the star wheel and is moved into engagement with the same by means of a projection or roller 212 mounted on the opposite end of the lever 210 and adapted to be engaged by the inclined forward edge of a segmental plate 213 rigidly secured to the operating shaft 85. When the machine is in its normal or idle position the roller 212 will lie at the lower end of the inclined forward edge of the plate 213. At the beginning of the movement of the operating shaft and before the movement of the actuator shaft begins the plate 213 will have moved the lever 210 about its pivotal center and carried the nose 211 into engagement with the star wheel 209, and, during the remainder of the movement of the operating shaft the roller will travel over the segmental surface of the plate and the nose 211 will be retained in engagement with the star wheel.

The plate 213 and the arrester plate 197 are both rigidly secured to the shaft 85 and are preferably formed integral. The adjacent edges of these plates are arranged to engage stops fixed on the main frame and thus limit the movement of the shaft 85 in each direction. These stops, in the present instance, are shown as projections 206 carried by a block 207 slidably mounted on the main frame. The stops are preferably of raw hide or other suitable material, and, by making the block 207 adjustable, the stops can be adjusted to compensate for the wear thereon. The block, in the present instance, is connected to the end member of the main frame by screws 208 extending through slots in the opposite ends thereof.

A suitable device is provided to prevent the overthrow of the trip counter actuating shaft 19, and, as here shown, this device comprises a four tooth ratchet wheel 214 rigidly secured to the shaft 19 and having its teeth spaced equal distances about the shaft. A pawl 215 is pivotally mounted on the end of the main frame and has its nose shaped to correspond approximately to the shape of the inclined sides of the teeth of the ratchet wheel 214 and adapted to substantially fill the space between two adjacent teeth of said ratchet wheel. A spring 216 holds the pawl normally in engagement with the ratchet wheel, but yields to permit the same to ride over the teeth of the ratchet wheel when the shaft 19 is rotated. Upon the completion of a quarter revolution of the shaft 19 one of the teeth of the ratchet wheel will pass beyond the end of the pawl 245 and the spring will instantly draw the nose of the pawl into engagement with the inclined face of the following tooth and will effectually prevent any further movement of the shaft until positive force is applied thereto. Further, the end of the pawl engages the radial face of the preceding tooth and prevents any rearward movement of the shaft 19.

The accumulator is held against downward movement, i. e., such movement as will enable the same to be connected with the total counters, until the inspector or other authorized person has inserted his key and rotated the same to set the identifying counter wheels to print his number. This is accomplished in the present instance by providing the rock-shaft 33 with a depending arm 217 having a laterally extending projection 218. A finger 219 rigidly secured to a shaft 220 extending lengthwise of the machine and journaled in the end walls thereof is arranged normally in the path of the projection 218. An arm 221 is rigidly secured to the shaft 220 and is operatively connected with a key-actuated lever 222 extending about the rear key barrel 223. The construction and operation of this key-actuated lever is substantially the same as that of the lever 204 and the rotation of the inspector's key will lift the rear end of the lever 222 and thus rock the shaft 220 and move the finger 219 out of the path of the projection 218. The shaft 33 is also provided at its other or left hand end with a similar arm 224 having a similar laterally extending projection 225 and the shaft 220 has rigidly secured thereto a finger 226 arranged normally in the path of the projection 225. Consequently, the rotation of the shaft 20 will simultaneously release the locking devices at both ends of the shaft 33 to permit the accumulator to be moved downward and operatively connected to the counters.

Means are provided for preventing the resetting of the accumulator counters until they have been moved into operative relation with the total counters. In the present instance this is accomplished by providing the accumulator shaft 31 with a disk 227 having a notch 228 adapted to receive a lug 229, secured to the main frame, when the accumulator shaft is in its normal or elevated position. Means are also provided for locking the accumulator shaft in its lowermost position and preventing its return until it has been actuated to reset the counters thereon to zero. To this end an arm 230 is rotatably mounted on the shaft 220 and provided with an upturned nose 231 which is held normally in engagement with the lower surface of the laterally extending projection 225 by a spring 232. When the accumulator is moved downward the projection 225 will be carried past the nose 231 and the spring will move the nose into engagement with the edge of the projection, thus locking the arm 224 and the shaft 33 against movement. An arm 237 is loosely mounted on the shaft 33 and a plate 233 is slidably mounted thereon and has a shoulder 234 extending beyond the edge of the arm 237 and above a shoulder 235 formed on the arm. A spring 236 tends to move the plate normally toward the inner end of the arm 237 and move the arm toward the accumulator. This movement of the arm is limited by a projection 238 upon the hub of the arm 237 which engages a fixed pin 239 mounted on the main frame. A disk 240 is rigidly secured to the accumulator shaft and is provided with a notch 241.

When the accumulator is moved downward that portion of the disk 240 immediately in the rear of the notch 241 will engage the nose 234 of the plate 233 and move the arm 237 about the axis of the shaft 33. As the accumulator shaft approaches the completion of its resetting movement the rear wall of the notch 241 will engage the edge of the nose 234 and move the plate 233 downward or toward the end of the arm 237. The plate 233 also has a laterally extending portion on which is secured a pin 242 and as the plate 232 moves downward this pin will engage a finger 243 rigidly connected with the arm 230 and rock the arm 230 about its pivotal center, and thus move the nose 231 of said arm out of engagement with the edge of the projection 225, thereby releasing the arm 224 and permitting the accumulator to be returned to its normal position. Means are also provided to prevent the accumulator from being moved into operative relation with the total counters until after the total counters have been reset to zero and also to prevent the accumulator from being moved into operative relation with the total counters while the machine is set to register a cash fare. See Fig. 45. To this end the shaft 33 upon which the accumulator arms are mounted is provided with an arm 244 having two branches, one extending upwardly at 245 and the other extending downwardly at 246. The branch 246 has a laterally extending projection 247 which normally rests upon the upper end of an arm 248 pivotally mounted on a stud 249 and having rigidly connected thereto an arm 250. These arms are preferably formed in a single piece and have secured thereto a tapered projection 251 which is adapted to be engaged by a spring-pressed pawl 252 having a tapered nose. This pawl will engage either side of the projection 251 and retain the arms in either one of their two positions until sufficient force is applied thereto to overcome the pressure of the spring.

The arm 250 is provided at its free end with a nose 253 which normally rests immediately in the rear of a projection 254 carried by a collar 255 which is rigidly secured to the rear or total counter shaft 9. When this shaft is rotated to reset the counters thereon the last portion of the movement thereof will cause the projection 254 to engage the nose 253 and thus move the arm 248 out of the path of the projection 247, thereby leaving the arm 244 free to move downward and permitting the accumulator to be moved into operative relation with the totalizing counters as soon as the other conditions have been fulfilled. The arm 250 also has at its free end a heel or projection 256 which is moved into a notch 257 in a disk 258 on the actuator shaft 30 when the arm 248 is moved out of the path of the projection 247. There are two of the notches 257 on the disk 258 owing to the fact that the shaft 30 makes but a half revolution at each operation thereof. One or the other of the notches 257 is always in position to receive the heel 256 of the arm 250. The parts will remain in this position until the machine is again operated to register a fare when the first movement of the actuator shaft 30 will move the arms 250 and 248 about their pivotal centers and restore the arm 248 to its normal or locking position.

While either the trip fare counters or the totalizing counters are being reset to zero the machine is locked against operation. For this purpose the operating shaft has rigidly secured thereto a projection 305, see Fig. 4, and the shaft 83 carries a finger 306 adapted to be moved into and out of the path of the projection 305 when the shaft 83 is rocked. As shown in Fig. 44 this shaft is so connected with the front and rear resetting shafts that it will be rocked whenever either of these shafts is reset. The spring 88 retains this shaft 83 normally in a position to hold the finger 306 out of the path of the projection 305, and it will extend into the path of the projection only while the nose of one of the arms, 99 and 103, rests upon the periphery of its coöperating disk.

It is necessary that the actuating gear 42 for the total cash counter of the accumulator should be moved into inoperative position before the accumulator is moved, otherwise the record would be disturbed by the connection between the actuating gear and the accumulator gear. See Figs. 6 and 10. To this end the sleeve 66 has an annular groove into which extends a pin 298 carried by an arm 299 pivotally mounted on the tie bar 3 and having a toothed segment 400 coöperating with a toothed segment 401 on the arm 57 to shift the sleeve 66 and gear 42 whenever the machine is set to register a ticket fare.

To prevent the accumulator from being moved into operative relation with the totalizing counters when the machine is set to register a cash fare a disk 259 is mounted on the actuator shaft 30 and operatively connected with the cam 47 so that it will be rotated with that cam when the cam is rotated from the setting shaft. See Fig. 45. The disk is provided on one side thereof with a cutaway portion or recess 260 which is of such a length that when the actuator for the trip fare counters is in alinement with a ticket fare the recess 260 will be in alinement with a nose 261 carried by the branch 245 of the arm 244 and this arm will be free to move about its pivotal center when the other conditions are fulfilled. When the actuator is in alinement with a cash fare the periphery of the disk 259 will be in engagement with the nose 261 of the arm and the arm will be held against movement.

The machine is locked against operation while the accumulator is operatively connected with the totalizing counters. This is accomplished in the present instance by providing the operating shaft with a segmental plate 302, (see Fig. 2) which is rigidly secured thereto and coöperates with an arm 303 pinned to the shaft 33 and having a nose 304 which is so arranged that it will be moved into the path of the plate 303 when the accumulator is moved downward and the shaft 33 rocked. So long as the parts remain in these positions no movement can be imparted to the operating shaft. Locking devices are also provided to prevent the register from being operated to register a fare after a record has been printed from either the trip counters or the totalizing counters and before the counters from which the record was printed have been reset to zero. These devices, as here shown, (see Fig. 3) comprise two levers 262 and 263, both of which are pivotally mounted on a stud 264 in the end member of the main frame and each of which is provided with a shoulder 265 adapted to extend over the end of a locking plate 266 rigidly secured to the operating shaft 85 and thus lock this shaft against movement. The levers are provided in their ends with two notches 267 adapted to receive the nose of a spring-pressed pawl 268 which will retain the levers in either of their positions until sufficient force is applied thereto to overcome the pressure of the spring on the pawl. The inner lever, 263, is adapted to lock the trip counters and has its lower end forked. An arm 269 of the lever 263 is arranged close to one end of a cam plate 270 pivotally mounted on the end member of the main frame. This cam plate is operatively connected with the printing mechanism for the register and is designed to feed the paper forward the desired distance upon each operation of the printing mechanism. To this end it is provided with cam grooves 271 and 272 adapted to receive a roller 273 carried by a crank arm 274 which is rigidly secured to the printing shaft 275. The printing mechanism, paper feeding mechanism and its operating cam plate are similar to those shown and described in our above mentioned co-pending application and need not be here described further than to state that the shape of the cam 272 is such that the first portion of the movement of the roller 273 therein will cause the cam plate to move a short distance toward the rear of the machine and the continued movement of the roller will cause the plate to move toward the front of the machine. A second arm, 276, of the lever 263 is arranged near the end of the front counter shaft 8 which has mounted thereon a collar 277 carrying a pin 278. When the printing mechanism is operated the rearward movement of the cam plate 270 will cause the same to engage the arm 269, rock the lever 263 about its pivotal center and move the arm 276 into the path of the pin 278 on the collar carried by the counter shaft, and also moving the shoulder 265 of the arm 263 into the path of the locking plate 266 carried by the operating shaft 85 and thereby locking the register against operation. When the counter shaft 8 is rotated to reset the counters thereon the pin 278 will engage the end of the arm 276, which is inclined, and move the lever 263 about its pivotal center in a direction to carry the shoulder of said lever out of the path of the locking plate 266, thereby releasing the operating shaft. The lever 262 also has its lower end forked and the arm 279 extends into a position to be engaged by the crank arm 274 when the printing shaft is actuated to print from the rear or totalizing counter shaft. When the arm 279 is so engaged the lever 262 will be moved about its pivotal center and the shoulder 265 thereof carried into the path of the locking plate 266, and the same movement will carry an arm 280 of the lever into the path of a pin 281 carried by a collar 282 rigidly secured to the rear or totalizing counter shaft 9, and, when this shaft is reset, the finger will engage the arm 280 and rock the lever 262 about its pivotal center to carry the shoulder 265 thereof out of the path of the locking plate 266.

The printing shaft 275 has rigidly secured thereto a hand wheel 283 for rotating the same and means are provided for controlling the manipulation of the shaft. See Figs. 46 to 48. To this end the handle has rigidly connected thereto a sleeve 284 provided with a cam groove consisting of a short circumferential portion 285, a longer circumferential portion 286 and a transverse portion 287 connecting the two circumferential portions. This sleeve extends through the cabinet 7 and is slidably mounted on the shaft but held against rotation relatively thereto. A spring 288 tends to hold the collar and the hand wheel normally in their outermost positions. When in these positions a pin 289 rigidly secured to the cabinet 7 will lie at one end of the short cam groove 285 and the only operation possible, with the hand wheel in its outer position, is to rotate the wheel to the end of the groove 285 and thence back. The sleeve 284 is provided in its inner portion with a circumferential groove 290 and the rear wall of this groove has a recess 291. Pivotally mounted on a stud shaft 292 journaled in the wall of the cabinet is an indicator finger or pointer 293 adapted to be moved into position to indicate either the word "Total" or the word "Trip". Mounted on the shaft 292 on the inside of the cabinet is a pawl 294, the end of which is so arranged that when the pointer indicates "Trip" it will be out of engagement with the sleeve 284, but, when the point of the indicator indicates "Total" the nose of the pawl will extend into the recess 291. When in this position the pawl will positively limit the movement of the sleeve 284, and, when the sleeve has been rotated until the pawl is in engagement with the wall of the recess, the pin 289 will be in alinement with the transverse groove 287 and an inward thrust on the handle and sleeve will cause the sleeve to move inwardly and the pin will enter the longer circumferential groove 286 and the pawl will enter the groove 290, thus enabling the sleeve and the shaft to be rotated through practically a complete revolution and thereby actuating the printing mechanism to print from the totalizing counters, at the end of which movement the sleeve will again move outward and the parts will assume their normal positions.

The operation of the machine will be readily understood from the foregoing descriptions of the several parts thereof and it will be apparent that any one of the several cash counters may be actuated to register a fare corresponding in denomination to that counter and that such registration will add one to the count of that particular counter; that simultaneously with the registration of this fare the amount thereof in cents will be added to the total cash counters both for the total record and for the accumulator record; that the total cash fare counters for both of these records will be advanced one point for each cash fare registered; that those cash fares which are in multiples of ten will be directly added to the tens counter wheels of the total cash counters; that when the fare is not a multiple of ten that portion of the same which is divisible by ten will be added directly to the tens counter wheels and the odd cents will be added to the units counter wheels; that when a ticket fare is registered the cash fare counting and registering devices are rendered inoperative; and that these several devices are controlled and actuated by the setting and actuating mechanism for the register and require no effort on the part of the operator other than that required to register a fare in the ordinary manner. It will further be apparent that a system of locks is provided whereby the several operations of the machine must necessarily be performed in their proper order and whereby the operator is effectually prevented from tampering with the machine or manipulating the registering devices to cause the same to produce a garbled or inaccurate record.

While we have shown and described the invention as applied to a fare register it will be apparent that the invention is not confined to registers of this character but is adaptable to registers of various kinds. And further, it will be apparent that various changes can be made in the construction and arrangement of the several parts of the device without departing from the spirit of the invention and we, therefore, wish it to be understood that we do not desire to be limited to the details of construction shown and described, for obvious modifications will occur to a person skilled in the art.

Having thus fully described our invention, what we claim as new and desire to secure by Letters Patent, is:—

1. The combination, with a plurality of cash fare counters adapted to register cash fares of different denominations, means for actuating any one of said counters to cause it to register a cash fare, a ticket counter, and means for actuating the same, of a total cash registering device, a connection between the actuating means for said cash fare counters and said total cash registering device to cause the latter to register the sum of the several fares registered by said cash fare counters, a total cash fare counter, and a connection between said total cash fare counter and the actuating means for said cash fare counters for actuating the former to cause it to register the number of fares registered by said cash fare counters, said total cash registering device and said total cash fare counter being independent of said ticket counter and unaffected by the operation of the actuating means for said ticket counters.

2. The combination, with a plurality of cash fare counters adapted to register cash fares of different denominations, means for actuating any one of said counters to cause it to register a cash fare, ticket counters, and means for actuating the same, a total cash registering device, and a connection between the actuating means for said cash fare counters and said total cash registering device to cause the latter to be actuated each time a fare is registered by one of said cash fare counters, of controlling mechanism for the actuating means of said total cash registering device, whereby the latter is caused to register the amount of the fare registered by said cash fare counter, a total cash fare counter, and a connection between said total cash fare counter and the actuating means for said cash fare counters for actuating the former to cause it to register the number of cash fares registered by said cash fare counters, said total cash registering device and said total cash fare counters being independent of said ticket counters and unaffected by the operation of the actuating means for said ticket counters.

3. The combination, with a plurality of cash fare counters, means for actuating any one of said counters, a total cash registering device, means for actuating said total cash registering device, a total cash fare counter, and means for actuating the same, of operating mechanism to simultaneously actuate all of said actuating means to cause one of said fare counters to register a fare, to cause the amount of said fare to be added to said total cash registering device and to cause a unit to be added to said total cash counter.

4. The combination, with a plurality of cash fare counters and an actuating device therefor, ticket counters, and means for actuating the same, a total cash registering device to register the sum of the cash fares received, an actuating device therefor, a total cash fare counter to register the number of cash fares received, and an actuating device therefor, said total cash registering device and said total cash counters being independent of said ticket counters and unaffected by the operation thereof, of operating mechanism operatively connected with the actuating devices for said cash fare counters, said total cash registering devices and said total cash fare counters, whereby a single movement on the part of the operator will impart movement to all of said actuating devices.

5. The combination, with a plurality of cash fare counters, an actuator therefor, means for setting said actuator to actuate one of said counters, ticket counters, and actuating means therefor, a total cash registering device to register the sum of the cash fares received, a total cash fare counter to register the number of cash fares received, said total cash registering device and said total cash fare counters being independent of the ticket counters and their operating means, and actuating devices for said total cash registering device and said total cash fare counter, of means controlled by said setting means for controlling the operation of said total cash registering device and said total cash fare counter.

6. The combination, with a plurality of cash fare counters, an actuating device therefor, setting mechanism to set said actuating device to cause it to actuate one of said fare counters, ticket counters, means for actuating the same, a total cash registering device to register the sum of the cash fares received, a total cash fare counter to register the number of cash fares received, and actuating devices for said total registering devices, said total registering devices being independent of the ticket counters and their actuating means, of means for operatively connecting said actuating devices for said total cash registering device and said total cash fare counter with said setting mechanism, and means for operating said actuating devices.

7. The combination, with a plurality of cash fare counters, an actuating device therefor, setting mechanism to set said actuating device to cause it to actuate one of said fare counters, ticket counters, means for actuating the same, a total cash registering device to register the sum of the cash fares received, a total cash fare counter to register the number of cash fares received, and actuating devices for said total registering devices, said total registering devices being independent of the ticket counters and their actuating means, of cam-controlled means for operatively connecting the operating devices for said total cash registering device and said total cash fare counter with said setting mechanism, and actuating means for said actuating devices.

8. The combination, with a plurality of trip cash fare counters, an actuating device therefor, setting mechanism for said actuating device, a total cash registering device, a total cash fare counter, and actuating devices for said total cash registering device and said total cash fare counter, of means for operatively connecting the actuating device for said total cash registering device with said setting mechanism, and an operating device operatively connected with the actuating devices for said trip fare counters, said total cash fare counters and said total cash registering device.

9. The combination, with a plurality of cash fare counters, an actuating device therefor, setting mechanism for said actuating device, and a total cash registering device, of an actuating shaft, an actuating member for said total registering device loosely mounted on said shaft, a ratchet wheel connected to and rotatable with said actuating member, a supporting member mounted on said shaft and held against rotation relatively thereto, a pawl mounted on said supporting member and having a lateral projection, a gear loosely mounted on said shaft and having a projection arranged in the path of the projection on said pawl, and a geared connection between said gear and said settting mechanism to adjust the position of said gear.

10. The combination, with a plurality of cash fare counters, an actuating device therefor, and setting mechanism for said actuating device, of two groups of total cash registering devices, means for resetting said groups of registering devices to zero independently one of the other, an actuator shaft, and an actuator mounted on said shaft and adapted to actuate the respective groups of total cash registering devices, two ratchet wheels loosely mounted on said actuator shaft, a telescoping sleeve connecting the ratchet wheels with the respective actuators, an arm rigidly secured to said actuator shaft, a pawl carried by said arm and adapted to engage both of said ratchet wheels, means for rotating said actuator shaft, and a device controlled by said setting means to control the amount of movement imparted to said ratchet wheels by said pawl.

11. The combination, with a plurality of cash fare counters, an actuating device therefor, and setting mechanism for said actuating device, of a total cash registering device an actuating member therefor, a ratchet wheel operatively connected therewith, a pawl held normally out of engagement with said ratchet wheel, adjustable means controlled by said setting mechanism for moving said pawl into engagement with said ratchet wheel, means for imparting movement to said pawl, means for retaining said pawl in engagement with said ratchet wheel, and means for releasing said pawl from said retaining means.

12. The combination, with a plurality of cash fare counters, an actuating device therefor, and setting mechanism for said actuating device, of a total cash registering device, an actuating member therefor, a ratchet wheel operatively connected therewith, a pawl held normally out of engagement with said ratchet wheel, adjustable means controlled by said setting mechanism for moving said pawl into engagement with said ratchet wheel, operating means for imparting movement to said pawl, means for retaining said pawl in operative engagement with said ratchet wheel, and means controlled by said operating means for releasing said pawl from said retaining means.

13. The combination, with a plurality of cash fare counters, an actuating device therefor, and setting mechanism for said actuating device, of a total cash registering device, an actuating means therefor, means for resetting said registering device to zero, a ratchet wheel operatively connected with said actuating member, a pawl held normally out of engagement with said ratchet wheel, means controlled by said setting mechanism for moving said pawl into engagement with said ratchet wheel, operating means for said pawl, a device for retaining said pawl in operative engagement with said ratchet wheel, and means controlled by said operating means and by said resetting means for releasing said pawl from said retaining device.

14. The combination, with a plurality of cash fare counters, an actuating device therefor, and setting mechanism for said actuating device, of a total cash registering device, an actuating member therefor, a ratchet wheel operatively connected with said actuating member, an actuating shaft, a pawl operatively connected with said actuating shaft and supported normally out of engagement with said ratchet wheel, adjustable means operatively connected with said setting mechanism for moving said pawl into engagement with said ratchet wheel, a retaining member adapted to engage a part carried by said pawl and hold the same in engagement with said ratchet wheel, and means for automatically releasing said pawl from said retaining member.

15. The combination, with a plurality of cash fare counters, an actuating device therefor, and setting mechanism for said actuating device, of a total cash registering device, an actuating member therefor, a ratchet wheel operatively connected with said actuating member, an actuating shaft, a pawl operatively connected with said actuating shaft and supported normally out of engagement with said ratchet wheel, adjustable means operatively connected with said setting mechanism for moving said pawl into engagement with said ratchet wheel, an arm movably mounted on said actuating shaft, and a spring connected with said arm and adapted to move the same into engagement with the part carried by said pawl to retain said pawl in operative engagement with said ratchet wheel, a trip arm, and means for actuating said trip arm to move said retaining arm out of engagement with said pawl.

16. The combination, with a plurality of cash fare counters, an actuating device therefor, and setting mechanism for said actuating device, of a total cash registering device, an actuating shaft, an actuating member for said total registering device, loosely mounted on said actuating shaft, a ratchet wheel loosely mounted on said actuating shaft and connected with said actuating member, a plate rigidly secured to said actuating shaft, a pawl mounted on said plate and having a tail portion and a lateral projection, means for retaining said pawl normally out of engagement with said ratchet wheel, a gear rotatably mounted on said shaft and operatively connected with said setting mechanism, a part carried by said gear and arranged in the path of the lateral projection carried by said pawl to move the pawl into engagement with said ratchet wheel, an arm loosely mounted on said actuating shaft and having a shoulder adapted to engage the tail portion of said pawl, a spring connected with said arm to hold said shoulder in engagement with said tail portion, an operating mechanism to rotate said actuating shaft, a trip arm, and means controlled by said operating mechanism for moving said trip arm into engagement with said arm to move the same out of engagement with the tail portion of the pawl.

17. The combination, with a plurality of cash fare counters, an actuating device therefor, and setting mechanism for said actuating device, of a total cash registering device, an actuating member therefor, means for resetting said registering device to zero, a ratchet wheel operatively connected with said actuating member, a pawl held normally out of engagement with said ratchet wheel, adjustable means controlled by said setting mechanism for causing said pawl to engage said ratchet wheel, a retaining device to hold said pawl in engagement with said ratchet wheel, a trip arm, and means controlled by said resetting means for actuating said trip arm to release said pawl from said retaining device.

18. The combination, with a plurality of cash fare counters, and means for actuating the same, of a total cash registering device comprising a units counter wheel and a tens counter wheel, means for actuating said units counter wheel, means for transferring the count from said units counter wheel to the tens counter wheel, and means for actuating the tens counter wheel independently of the units counter wheel.

19. The combination, with a plurality of registering devices adapted to register items containing different numbers of units, an actuating device for said registering devices, and means for setting said actuating device to cause one of said registering devices to register an item, of a registering device adapted to register the total of the units contained in the items registered by the first mentioned registering devices, and two actuating members for said total registering device, one of which is adapted to actuate the units counter wheel and the other of which is adapted to actuate the tens counter wheel.

20. The combination, with a plurality of registering devices adapted to register items containing different numbers of units, an actuating device for said registering devices, and means for setting said actuating device to cause one of said registering devices to register an item, of a registering device adapted to register the total of the units contained in the items registered by the first mentioned registering devices, two actuating members for said total registering device, one of which is adapted to actuate the units counter wheel and the other of which is adapted to actuate the tens counter wheel, and means actuated by said setting mechanism for controlling the operation of said actuating members.

21. The combination, with a plurality of registering devices adapted to register items containing different numbers of units, an actuating device for said registering devices, and means for setting said actuating device to cause one of said registering devices to register an item, of a registering device adapted to register the total of the units contained in the items registered by the first mentioned registering devices, two actuating members for said total registering device, one of which is adapted to actuate the units counter wheel and the other of which is adapted to actuate the tens counter wheel, means controlled by said setting mechanism to move the units actuating member into and out of operative relation with the units counter wheel, and means operatively connected with said setting mechanism to control the amount of movement imparted to the actuating member for said tens counter wheel.

22. The combination, with a plurality of registering devices, an actuating device for said registering devices, and means for setting said actuating device to cause one of said registering devices to register an item, of a total registering device comprising a units counter wheel and a tens counter wheel, an actuating member for each of said counter wheels, cam controlled mechanism operatively connecting the actuating member for the units counter wheel with said setting mechanism, and a second cam controlled mechanism operatively connecting said actuating member for the tens counter wheel with said setting mechanism to control the amount of movement imparted to said actuating member.

23. The combination, with a plurality of cash fare counters, and a plurality of ticket fare counters, mechanism for actuating one of said counters for registering a fare, and means for setting said actuating mechanism to cause it to actuate the desired counter, of a total cash registering device, a plurality of total ticket fare counters, means for operating said total cash fare registering device each time a cash fare is registered, and mechanism controlled by said setting means for actuating one of said total ticket fare counters each time a ticket fare is registered 24. The combination, with a plurality of cash fare counters, a plurality of ticket fare counters, an actuating device for actuating any one of said counters to register a fare, and setting mechanism for controlling said actuating device, of a total cash registering device, an actuating member therefor, operating mechanism for said actuating member, a plurality of total ticket counters, mechanism controlled by said setting means for actuating one of said total ticket counters each time a ticket fare is registered, and means for disconnecting the actuating member for said total cash registering device from its operating mechanism when a ticket fare is registered.

25. The combination, with a plurality of cash fare counters, a plurality of ticket counters, mechanism for actuating any one of said counters to register a fare, means for setting said actuating mechanism to cause it to actuate the desired counter, a plurality of total ticket counters, and means for actuating one of said total ticket counters each time a ticket fare is registered, of a total cash registering device, operating mechanism for said actuating member, and means controlled by the operation of said setting mechanism for disconnecting said actuating member from its operating mechanism.

26. The combination, with a plurality of cash fare counters, a plurality of ticket fare counters, an actuating device for actuating one of said counters to register a fare, setting mechanism for controlling said actuating device, a plurality of total ticket counters, and means for actuating one of said total ticket counters each time a ticket fare is registered, of a total cash registering device comprising a units counter wheel and a tens counter wheel, an actuating member for said units counter wheel, a second actuating member for said tens counter wheel, and operating mechanism for said actuating members, means controlled by said setting mechanism for moving the actuating member for said units counter wheel into an inoperative position, and means controlled by said setting mechanism for disconnecting the actuating member for said tens counter wheel from said operating mechanism.

27. The combination, with a plurality of cash fare counters, a plurality of ticket fare counters, an actuating device for actuating one of said counters to register a fare, setting mechanism for controlling said actuating device, a plurality of total ticket counters, and means for actuating one of said total ticket counters each time a ticket fare is registered, of a total cash registering device comprising a units counter wheel and a tens counter wheel, an actuating member for said units counter wheel, a separate actuating member for said tens counter wheel, a ratchet wheel operatively connected with said second actuating member, a pawl normally supported out of engagement with said ratchet wheel, a device for moving said pawl into engagement with said ratchet wheel, and means for rendering said device inoperative and for moving the actuating member for said units counter wheel into an inoperative position when one of said ticket fare counters is actuated.

28. The combination, with a plurality of cash fare counters, a plurality of ticket fare counters, an actuating device for actuating one of said counters to register a fare, setting mechanism for controlling said actuating device, a plurality of total ticket counters, and means for actuating said total ticket counters each time a ticket fare is registered, of a total cash registering device, an actuating shaft, an actuating member mounted on said shaft, operating mechanism connected with said actuating member, means for connecting said actuating member with said operating mechanism, and a cam controlled device mounted on said actuating shaft for rendering said connecting means inoperative when one of said ticket fare counters is actuated.

29. The combination, with a plurality of cash fare counters, a plurality of ticket fare counters, an actuating device for actuating one of said counters to register a fare, setting mechanism for controlling said actuating device, a plurality of total ticket counters, and means for actuating said total ticket counters each time a ticket fare is registered, of a total cash registering device comprising a units counter wheel and a tens counter wheel, an actuating shaft, an actuating member for said units counter wheel mounted on said actuating shaft, an actuating member for said tens counter wheel loosely mounted on said shaft, driving mechanism for said actuating members, and a member rotatably and slidably mounted on said actuating shaft and having a part adapted to connect the actuating member for said tens counter wheel with the driving mechanism, a cam mounted on said actuating shaft and operatively connected with said setting mechanism and said rotatable and slidable member to cause said member to be moved into an inoperative position when one of said ticket fare counters is operated, and a second cam mounted on said actuating shaft and operatively connected with said setting mechanism and the actuating member for said units counter wheel to move said actuating member into an inoperative position when one of said ticket counters is actuated.

30. The combination, with a plurality of cash fare counters, a plurality of ticket fare counters, an actuating device for actuating one of said counters to register a fare, setting mechanism for controlling said actuating device, a plurality of total ticket counters, and means for actuating said total ticket counters each time a ticket fare is registered, of a total cash registering device comprising a units counter wheel and a tens counter wheel, an actuating shaft, an actuating member for said units counter wheel slidably mounted on said shaft, an actuating member for said tens counter wheel mounted on said shaft, a ratchet wheel operatively connected with said actuating member for said tens counter wheel, operating mechanism for said actuating member, a pawl connected with said operating mechanism and held normally out of engagement with said ratchet wheel, a device for moving said pawl into engagement with said ratchet wheel, a pivoted arm operatively connected to said device to move the same into and out of its operative position, a cam operatively connected with said setting mechanism, a second pivoted arm, a pin carried by said second arm and engaging said cam, a connection between said pivoted arms, a second cam operatively connected with said setting mechanism, and a connection between said second cam and the actuating member for said units counter wheel.

31. The combination, with a plurality of cash fare counters, a plurality of ticket fare counters, an actuating device for actuating one of said counters to register a fare, setting mechanism for controlling said actuating device, a plurality of total ticket counters, and means for actuating said total ticket counters each time a ticket fare is registered, of a total cash registering device comprising a units counter wheel and a tens counter wheel, an actuating member for said units counter wheel, a second actuating member for said tens counter wheel, means for operating said actuating members, means controlled by said setting mechanism for controlling the amount of movement imparted to said second actuating member, a total cash fare counter, an actuating member for said total cash fare counter, means controlled by said setting mechanism for moving the actuating member for said units counter wheel into and out of its operative relation to that wheel and for moving the actuating member for said total cash fare counter into and out of its operative relation with that counter.

32. The combination, with a plurality of cash fare counters, a plurality of ticket fare counters, an actuator adapted to be moved into operative relation with any one of said counters, and a setting shaft to control the position of said actuator, of a total cash fare registering device comprising a units counter wheel and a tens counter wheel, a plurality of total ticket fare counters, an actuator shaft, an actuating member for said units counter wheel mounted on said shaft, an actuating member for said tens counter wheel mounted on said shaft, an actuator adapted to be moved into operative relation with any one of said total ticket fare counters also mounted on said actuator shaft, operating mechanism for said actuating members, means for operatively connecting the actuating member for said tens counter wheel with said operating mechanism, a cam mounted on said actuator shaft and operatively connected with said setting mechanism for controlling the connection between said actuating member and said operating mechanism, a second cam mounted on said actuating shaft and operatively connected with said setting mechanism for moving the actuating member for said units counter wheel into and out of its operative relation to that counter wheel, and a third cam mounted on said actuator shaft and operatively connected with said setting mechanism to move the actuating member for said ticket fare counters into operative relation with one of said counters.

33. In a fare register, the combination, with a plurality of fare counters, means for actuating any one of said fare counters, and setting mechanism to control said actuating means, of an indicator comprising two drums, a ribbon connected at its opposite ends to said drums and bearing designations of the several fares, and a connection between said drums and said setting mechanism to operate said ribbon to bring into view that designation corresponding to the fare which the actuating means is set to register.

34. In a fare register, the combination, with a plurality of fare counters, means for actuating any one of said fare counters, and setting mechanism to control said actuating means, of an indicator comprising two drums, a ribbon connected at its opposite ends to said drums and bearing designations of the several fares, a connection between said drums and said setting mechanism to operate said ribbon to bring into view that designation corresponding to the fare which the actuating means is set to register, and means for taking up the slack in said ribbon as it is fed from one drum to the other.

35. In a fare register, the combination, with a plurality of fare counters, means for actuating any one of said fare counters, and setting mechanism to control said actuating means, of an indicator comprising two drums, a ribbon connected at its opposite ends to said drum and bearing designations of the several fares, a connection between said drums and said setting mechanism to operate said ribbon to bring into view that designation corresponding to the fare which the actuating means is set to register, a pivoted arm, a roller carried by said arm and adapted to engage said ribbon, and a spring tending to move said roller away from said drums.

36. The combination, with a plurality of registering devices, an actuator for said devices, a setting shaft to control the position of said actuator, and operating mechanism to impart actuating movement to said actuator, of means controlled by said actuating mechanism for actuating said setting shaft to aline said actuator with the particular registering device which is to be actuated.

37. The combination, with a plurality of registering devices, an actuator adapted to be moved into operative relation with any one of said registering devices, a setting shaft to control the position of said actuator, and an operating shaft to impart actuating movement to said actuator, of a notched disk rigidly secured to said setting shaft, a lever pivotally supported between its ends and having a tapered nose adapted to engage one of the notches of said disk, a projection carried by that end of the lever opposite said nose, and a part carried by said operating shaft to engage said projection, rock said lever about its pivotal support and cause said nose to enter one of the notches in said disk.

38. The combination, with a registering device, an actuator therefor, a rockshaft to impart actuating movement to said actuator, and a key-controlled identifying device, of a projection rigidly secured to said operating shaft, and an arm operatively connected with said key-controlled identifying device and adapted to be moved into and out of the path of said projection by the operation of said key-controlled device.

39. The combination, with a registering device, an actuator therefor, and a rockshaft to impart actuating movement to said actuator, of two projections rigidly secured to said shaft in substantially the same radial plane, and a fixed stop adapted to be engaged by the respective projections to limit the movement of said shaft.

40. The combination, with a registering device, an actuator therefor, and an operating shaft to impart actuating movement to said actuator, of two plates rigidly secured to said operating shaft and having their adjacent edges spaced apart; two stops adjustably mounted between said plates and adapted to be engaged by the respective plates to limit the movement of said operating shaft.

41. The combination, with a registering device, an actuator therefor, an operating shaft to impart actuating movement to said actuator, an accumulator, and a supporting shaft for said accumulator, of an arm rigidly secured to said operating shaft, an arm rigidly secured to said supporting shaft and having a nose adapted to extend into the path of the arm of said operating shaft when said accumulator is moved from one position to another.

42. The combination, with a registering device, an actuator shaft, an actuator carried thereby, and an operating shaft, of two segments rigidly secured to said operating shaft, a gear loosely mounted on said actuating shaft and meshing with one of said segments, a second gear loosely mounted on said actuating shaft and meshing with an idle pinion, which in turn meshes with the other of said segments, two ratchet wheels rigidly secured to said actuating shaft, and pawls connected with the respective gears and adapted to engage the respective ratchet wheels.

43. The combination, with a registering device, an actuator shaft, an actuator carried by said shaft, and an operating shaft connected with said actuating shaft, of a plurality of stops secured to said actuating shaft, a pivotally supported finger having one end adapted to be moved into and out of the path of said stops, and means controlled by the movement of said operating shaft for moving said finger.

44. The combination, with a registering device, an actuator shaft, an actuator carried by said shaft, and an operating shaft connected with said actuating shaft, of a plurality of stops secured to said actuating shaft, a pivotally supported finger having one end adapted to be moved into and out of the path of said stops, a plate rigidly fixed to said operating shaft and having a cam groove therein, a projection rigidly connected with said finger, and a pin carried by said projection and extending into said cam slot, whereby the movement of said operating shaft will impart movement to said finger.

45. The combination, with a plurality of cash fare counters, a plurality of ticket fare counters, an actuator shaft, an actuator mounted on said shaft and adapted to be moved into operative relation with any one of said fare counters, and an accumulator movable from one position to another, of a disk rigidly secured to said actuating shaft and having a recess in one side thereof, a supporting shaft for said accumulator, an arm rigidly secured to said supporting shaft and having a nose so arranged relatively to the recess in said disk that when said actuator is in operative relation with a ticket fare counter said nose will be in alinement with said recess.

46. The combination, with a resetting shaft, a series of counter wheels mounted thereon, an accumulator, means for actuating said accumulator and said counter wheels, and a supporting shaft for said accumulator, of an arm rigidly secured to said supporting shaft, a second arm pivotally supported and having one end arranged normally in the path of the first mentioned arm, said second arm having a branch, and a projection rigidly secured to said resetting shaft and adapted to engage the branch of said second arm and move said second arm out of the path of the first mentioned arm when said resetting shaft is rotated.

47. The combination, with a resetting shaft, a plurality of counters mounted thereon, and an operating shaft, of a projection carried by said operating shaft, a second shaft, a finger carried by said second shaft adapted to be moved into and out of the path of said projection, a crank arm carried by said second shaft, a lever operatively connected with said crank arm, a disk rigidly secured to said resetting shaft and having a notch and a projection carried by said lever and resting normally in said notch, whereby the rotation of said resetting shaft will force said projection out of said notch and rock said second shaft.

48. The combination, with a registering device, a resetting shaft therefor, an operating shaft, printing mechanism comprising a shaft, and a plate rigidly secured to said shaft, of an arm rigidly secured to said operating shaft, a lever pivotally mounted and having a shoulder adapted to be moved into and out of the path of said arm, means for retaining said lever in adjusted positions, a part carried by said lever extending into the path of the plate on said printing shaft, a projection rigidly connected with said resetting shaft, and a second part carried by said lever and adapted to be moved into the path of said projection by the movement of the plate on said printing shaft.

49. The combination, with a registering device, an accumulator comprising a resetting shaft, and a supporting shaft for said accumulator, of an arm rigidly secured to said supporting shaft and having a laterally extending projection, a second arm pivotally supported and having a nose adapted to be moved into the path of said projection, a finger rigidly connected with said second arm, a plate carried by said supporting shaft and movable toward and away from the same, a disk rigidly secured to said resetting shaft and having a notch, a projection on said movable plate adapted to enter said notch when said resetting shaft is rotated and to impart movement to said plate, and a pin carried by said plate and adapted to engage said finger to move said second arm and release the first mentioned arm.

50. The combination, with a shaft, a plurality of counting wheels loosely mounted thereon and each comprising a gear, a second shaft extending parallel with the first shaft, a plurality of segmental gears loosely mounted on said second shaft, an operative connection between each of said segmental gears and the gear of the respective counting wheel, and a lever operatively connected with each of said segmental gears, whereby each of said counting wheels can be set independently of the other counting wheels.

51. The combination, with a registering device comprising a resetting shaft, a pivoted arm, an indicator plate carried by said arm and adapted to be moved from one position to another, a crank arm rigidly connected with said first mentioned arm and having a laterally extending pin, a gear supported adjacent to said crank arm and having a laterally extending pin arranged to coöperate with the first mentioned pin, a mutilated gear carried by said resetting shaft, and an operative connection between said mutilated gear and the first mentioned gear, whereby said first mentioned gear will be moved through a half revolution for each movement of the resetting shaft, and a spring connected to said arm and tending to retain said indicator plate in one position.

52. The combination, with trip registering devices and total registering devices, of a printing mechanism adapted to print a record from either of said registering devices and comprising a shaft, and a hand-wheel slidably mounted on said shaft and held against rotation relatively thereto, of a sleeve rigidly secured to said hand-wheel and having a cam groove and a fixed projection extending into said cam groove.

53. The combination, with a main frame, trip registering devices and total registering devices mounted in said main frame, printing mechanism to print a record from either of said registering devices and comprising a shaft, and a cabinet inclosing said main frame and said registering devices, of a hand-wheel, a sleeve rigidly secured to said hand-wheel, slidably mounted on said shaft, held against rotation relatively thereto and extending through the wall of said cabinet, said sleeve having a cam groove, a pin rigidly secured to said cabinet and extending into said groove, a stop carried by the inner end of said sleeve, and a finger adapted to move into and out of the path of said stop.

54. In a fare register, the combination, with a plurality of groups of printing counters, means for causing a part of said counters to register fares, means for causing other of said counters to register the time, and means for printing a record from said printing counters, of a plurality of groups of other printing counters, means to cause a part of said other counters to register the totals of the fares registered by the corresponding counters of the first-mentioned groups, means to cause other of said counters to register the date, and means for printing a record from the counters of the last-mentioned group.

55. In a machine of the character described, the combination, with a fare registering device, and means for resetting the same to zero, of a direction indicator comprising a plate movable from one position to another and bearing at each edge thereof two indications, and means controlled by the operation of said resetting means for shifting said plate from one position to another, of means controlled independently of said resetting means for concealing one of said two indications.

56. In a machine of the character described, the combination, with a registering device, a cabinet having a sight opening, and a plate mounted within said cabinet having two indications simultaneously in alinement with said sight opening, of a shutter movably mounted adjacent to said sight opening and arranged to conceal from view one of said indications.

57. In a machine of the character described, the combination, with a registering device, a cabinet having a sight opening, and a plate mounted within said cabinet having two indications simultaneously in alinement with said sight opening, of a shutter pivotally mounted within said cabinet extending across said sight opening, and means for moving said shutter from one position to another to cause it to extend in front of one or the other of said indications.

58. The combination, with a plurality of registering devices, an actuating device therefor, and setting mechanism for said actuating device, of a total registering device, an actuating member adapted to be moved bodily into and out of operative relation to said total registering device, a cam supported at a point remote from said actuating member and operatively connected with said setting mechanism, and an operative connection between said cam and said actuating member.

59. The combination, with a plurality of registering devices, an actuating device therefor, and setting mechanism for said actuating device, of a total cash registering device, a shaft, an actuating member mounted on said shaft and adapted to be moved into and out of operative relation to said total registering device, a cam operatively connected with said setting mechanism, and an operative connection between said cam and said actuating member.

60. The combination, with a plurality of registering devices, an actuating device therefor, and setting mechanism for said actuating device, of a total registering device, a shaft, an actuating member slidably mounted on said shaft and adapted to be moved into and out of operative relation to said total registering device, a cam rotatably mounted on said shaft and operatively connected with said setting mechanism, and a connection between said cam and said actuating member, whereby the rotation of the former will impart sliding movement to the latter.

61. The combination, with a main frame, a plurality of registering devices supported by said frame, an actuating device therefor, and setting mechanism for said actuating device, of a total registering device, a shaft, an actuating member slidably mounted on said shaft, a grooved collar connected with said actuating member, an arm pivotally mounted on said main frame, a pin carried by said arm and extending into the groove of said collar, a cam loosely mounted on said shaft, operatively connected with said setting mechanism and having a cam groove therein, a second arm pivotally mounted on said main frame and operatively connected with the first-mentioned arm, and a pin carried by said second arm and extending into the groove of said cam.

62. The combination, with a plurality of registering devices, an actuating device therefor, and setting mechanism for said actuating device, of a total registering device, a shaft, an actuating member slidably mounted on said shaft and adapted to be moved into and out of operative relation to said total registering device, means mounted on said shaft to control the amount of movement of said actuating member, a cam loosely mounted on said shaft and operatively connected with said setting mechanism, and a connection between said cam, said actuating member and the means for controlling the amount of movement of said actuating member.

63. The combination, with two sets of detail registering devices, and means to actuate the same, of a total cash registering device to indicate the sum of the items registered by one set of said detail registering devices, a second total registering device to indicate the number of items registered by said set of said detail registering devices, and devices to actuate both of said total registering devices, said total registering devices being independent of and unaffected by the operation of the other set of said detail registering devices.

64. The combination, with a plurality of cash fare counters adapted to register cash fares of different denominations, a plurality of ticket counters to register ticket fares, and means for actuating any one of said counters to cause it to register a fare, of a total cash registering device to compute and register the sum of the fares registered by said cash fare counters, a second total registering device to compute and register the number of fares registered by said cash fare counters, devices to actuate both of said total registering devices, said total registering devices being independent of and unaffected by the operation of said ticket counters.

65. The combination, with a plurality of cash fare counters adapted to register cash fares of different denominations, a plurality of ticket counters adapted to register paper fares of different kinds, an actuating device for said counters, and setting means to position said actuating device to actuate any one of said counters, of a total cash registering device to compute and register the sum of the fares registered by said cash fare counters, a second total registering device to compute and register the number of fares registered by said cash fare counters, and devices controlled by said setting mechanism to actuate said total registering devices only when the actuating device for said fare counters is positioned to actuate a cash fare counter.

66. The combination, with a cash fare counter, a ticket fare counter, and means for actuating said counters, of a total cash registering device to compute and register the sum of the fares registered by said cash fare counter, a second total registering device to compute and register the number of items registered by said cash fare counter, and devices to actuate said total registering devices, said total registering devices being independent of and unaffected by the operation of said ticket counter.

In testimony whereof, we affix our signatures in presence of two witnesses.

WILFRED I. OHMER.
DAVID B. WHISTLER.
JOHN E. McALLISTER.

Witnesses:
ROBERT E. COWDEN,
T. G. WHISTLER.